United States Patent
Kimura

(10) Patent No.: US 8,180,176 B2
(45) Date of Patent: May 15, 2012

(54) IMAGE PROCESSING DEVICE, IMAGE PROCESSING METHOD, IMAGE PROCESSING PROGRAM, RECORDING MEDIUM WITH IMAGE PROCESSING PROGRAM RECORDED THEREIN, AND IMAGE PROCESSING PROCESSOR

(75) Inventor: Masayuki Kimura, Osaka (JP)

(73) Assignee: Panasonic Corporation, Osaka (JP)

( * ) Notice: Subject to any disclaimer, the term of this patent is extended or adjusted under 35 U.S.C. 154(b) by 314 days.

(21) Appl. No.: 12/602,273

(22) PCT Filed: Jul. 10, 2008

(86) PCT No.: PCT/JP2008/001859
§ 371 (c)(1),
(2), (4) Date: Nov. 30, 2009

(87) PCT Pub. No.: WO2009/008174
PCT Pub. Date: Jan. 15, 2009

(65) Prior Publication Data
US 2010/0172598 A1 Jul. 8, 2010

(30) Foreign Application Priority Data
Jul. 12, 2007 (JP) .................................. 2007-183626

(51) Int. Cl.
*G06K 9/32* (2006.01)

(52) U.S. Cl. ........................................ 382/296; 382/276

(58) Field of Classification Search .................. 382/100, 382/276, 296
See application file for complete search history.

(56) References Cited

U.S. PATENT DOCUMENTS

| | | | | |
|---|---|---|---|---|
| 5,982,563 A * | 11/1999 | Nakamura et al. | ............ | 359/727 |
| 6,173,088 B1 * | 1/2001 | Koh et al. | ..................... | 382/289 |
| 6,411,743 B1 * | 6/2002 | Koh et al. | ..................... | 382/290 |
| 2003/0152291 A1 | 8/2003 | Cheatle | | |
| 2004/0101209 A1 | 5/2004 | Tanaka | | |

(Continued)

FOREIGN PATENT DOCUMENTS

JP 4-177583 6/1992

(Continued)

OTHER PUBLICATIONS

International Search Report issued Aug. 12, 2008 in International (PCT) Application No. PCT/JP2008/001859.

*Primary Examiner* — Stephen R Koziol
(74) *Attorney, Agent, or Firm* — Wenderoth, Lind & Ponack, L.L.P.

(57) ABSTRACT

When an image is captured by an imaging apparatus that is not on the premise that the image is captured, it is not possible to estimate objects included in the image in order to correct a tilt of the captured image. Therefore, a tilt angle of the captured image can be estimated based on areas not suitable for estimating the tilt angle of the captured image, and the captured image is corrected based on an incorrectly estimated tilt angle, which deteriorates the quality of the captured image. An image processing device is provided to divides the captured image into a plurality of areas, determine a directional characteristic shown by a texture of each of the divided areas, and estimate the tilt angle of the captured image based on one or more areas whose textures have the unidirectional characteristic to correct the captured image using the estimated tilt angle.

38 Claims, 19 Drawing Sheets

U.S. PATENT DOCUMENTS

| | | | |
|---|---|---|---|
| 2006/0165264 A1* | 7/2006 | Saitoh et al. | 382/115 |
| 2006/0165395 A1 | 7/2006 | Shimano et al. | |
| 2008/0240615 A1* | 10/2008 | Yamazaki | 382/287 |

FOREIGN PATENT DOCUMENTS

| | | |
|---|---|---|
| JP | 6-195462 | 7/1994 |
| JP | 6-215134 | 8/1994 |
| JP | 2001-101399 | 4/2001 |
| JP | 2002-92606 | 3/2002 |
| JP | 2003-304486 | 10/2003 |
| JP | 2004-534334 | 11/2004 |
| JP | 3676360 | 5/2005 |

* cited by examiner

FIG. 6A

| -1 | 0 | 1 |
|----|---|---|
| -2 | 0 | 2 |
| -1 | 0 | 1 |

FIG. 6B

| -1 | -2 | -1 |
|----|----|----|
| 0  | 0  | 0  |
| 1  | 2  | 1  |

IMAGE PROCESSING DEVICE, IMAGE PROCESSING METHOD, IMAGE PROCESSING PROGRAM, RECORDING MEDIUM WITH IMAGE PROCESSING PROGRAM RECORDED THEREIN, AND IMAGE PROCESSING PROCESSOR

TECHNICAL FIELD

The present invention relates to a technique for correcting an image captured by a wearable terminal.

BACKGROUND ART

In recent years, a wearable terminal that is capable of continuously keeping a record of daily life as a life-log has been introduced. The wearable terminal is a terminal device that can be used while being worn by a user at all times. The wearable terminal has a camera and a microphone, and is capable of keeping the record at all times without an operation by the user.

A patent document 1 discloses a wearable terminal that supports the memory and memory recall of the user by defining importance levels of information pieces acquired from the camera and the microphone for each event, and capturing these information pieces according to the importance levels. However, it is problematic that, due to a usage act that the wearable terminal keeps on capturing images while being worn by the user at all times, the qualities of the captured images notably deteriorate because of a motion of the user. In particular, it is problematic that when images are captured with the wearable terminal tilting off the horizontal, the captured images are tilted.

Meanwhile, a Patent document 2 discloses a method of correcting a tilt of a captured image by detecting line segments that exist in an upper part of the captured image, and estimating a tilt angle of the captured image as a whole based on tilt angles of the line segments. In the image correction method disclosed in the Patent document 2, it is presumed that the image is captured with the user standing substantially straight. Therefore, when the image is captured with the user standing substantially straight, it is expected that it is difficult to estimate a horizontal direction based on line segments that exist in a lower part of the captured image due to an influence by a ground and a shadow, while it is easy to estimate the horizontal direction based on line segments of structural objects and the like that exist in the upper part of the captured image. The method disclosed in the Patent document 2 has a feature of correcting the captured image by actively making use of the above-stated features of the captured image.

Patent document 1: Japanese Laid-open Patent Application Publication No. 2003-304486

Patent document 2: Japanese Patent Publication No. 3676360

DISCLOSURE OF THE INVENTION

The Problems to be Solved by the Invention

However, the expected correction effect is not necessarily obtained when the image correction method disclosed in the Patent document 2 is applied to images captured by the wearable terminal. Since the wearable terminal captures images while being worn by the user at all times, the images captured by the wearable terminal do not always have such simple structures that the captured images can be analyzed after being divided into only upper parts and lower parts. Therefore, the expected correction effect cannot be fully obtained with the method disclosed in the Patent document 2. Furthermore, in the method disclosed in the Patent document 2, a case is not expected where a sufficient feature for detecting tilts of the captured images cannot be obtained. Even in that case, the image correction is automatically performed with use of the estimated tilt angles. Therefore, the captured images may be more tilted in a wrong direction in some cases.

The above-stated problems lead to a problem of how to select a part of the captured image that is suitable for detecting the tilt. That is, in the case of estimating the tilt of the captured image based on the tilts of the line segments that exist in the captured image, the problem is how to distinguish between an area in which most of the line segments are oriented in the same direction and an area in which the line segments are randomly oriented. In the method disclosed in the Patent document 2, the captured image is simply divided into the upper part and the lower part based on experiences. Therefore, an application range of this method is limited.

The present invention provides an image processing device that corrects the tilts of any captured images, especially captured images that are not captured in an upright state such as images captured by the wearable terminal, by analyzing the captured images to estimate tilt angles thereof.

The areas composing each of the captured images correspond to pixel blocks each composed of pixels that compose a part of the corresponding captured image.

Means to Solve the Problems

In order to solve the above-stated problem, an image processing device according to the present invention is an image processing device for correcting a captured image composed of pixel blocks each composed of a predetermined number of horizontal and vertical pixels, with use of luminances each relating to a corresponding one of the pixels, the image processing device comprising: a judgment unit operable to, for each of the pixel blocks, (i) perform calculation by substituting pairs of values in an equation for obtaining a direction distribution, each of the pairs being composed of a value indicating a position of each of pixels that compose the pixel block, and a value indicating one of the luminances that is associated with the position, and (ii) judge whether or not the pixel block is suitable for estimating a tilt angle of a part of the captured image that corresponds to the pixel block based on the obtained directional distribution, the directional distribution showing a distribution of directions each characterized by a part or all of an edge of an object included in the part of the captured image, the part or all of the edge corresponding to linearly-arranged two or more of the pixels; a selection unit operable to select one or more of the pixel blocks that have been judged affirmatively; and a correction unit operable to obtain a tilt angle of the captured image with respect to a reference axis with use of one or more of the direction distributions obtained for the selected one or more of the pixel blocks, and perform the correction based on the tilt angle of the captured image.

Effect of the Invention

The image processing device having the above-stated structure: divides an input image into areas; determines what kind of directional characteristic a texture (luminance change) that exists in each divided area has; selects, based on the judgment, one or more areas in each of which the texture has a unidirectional characteristic; and estimates a tilt angle of the captured image based on the selected areas.

The texture is a pattern formed as a group of pixels having a large edge strength in the captured image. The texture that exists in an area has a unidirectional characteristic when most of the line segments included in the area that have each been formed by connecting adjacent pixels having large edge strengths are oriented substantially in one direction. The texture is obtained by performing calculation with use of pairs of positions and luminances each relating to a corresponding one of the pixels included the captured image. When the texture that exists in the area has a unidirectional characteristic, the edge of the structural objects such as a building is considered to be included in the area. Also, the edge of the structural object is highly likely to be oriented in a horizontal or vertical direction. In such a way, the image processing device estimates the tilt angle of the captured image by analyzing pixel information pieces such as luminances in the areas.

Accordingly, if one or more divided areas are areas in each of which most of the line segments are oriented in the same direction, it is possible to estimate the tilt angle of the captured image based on such areas even if these areas do not exist in the upper part of the captured image. The image processing device selects only one or more areas in each of which most of the line segments are oriented in the same direction in the captured image regardless of whether or not these areas exist in the upper part of the captured image, and excludes, in advance, one or more areas in each of which the line segments are randomly oriented. Therefore, the image processing device is capable of correctly estimating the tilt angle of the captured image, and correcting the tilt of the captured image even if areas that are suitable for estimating the tilt angle of the captured image and areas that are not suitable for estimating the tilt angle of the captured image exist together in the captured image.

The judgment unit may calculate directional distributions of luminance gradients.

Since the image processing device is capable of recognizing line segments included in the captured image and the directions in which the line segments are oriented as the luminance change and directions in which the luminance changes (i.e. luminance gradients), respectively, the image processing device is capable of determining what proportion of the line segments is oriented in the same direction based on the directional distribution of the luminance gradients.

The judgment unit may calculate a directional distribution of intensities of luminance spectrums.

Since luminance spectrums reflect frequency characteristics of the luminance distributions of the original image, it is possible to obtain a distribution of line segments in the original image by analyzing the luminance spectrums.

The selection unit may exclude, from selection targets, one or more areas in each of which a ratio of the number of pixels whose luminance change is larger than a predetermined luminance change to the number of all pixels is larger than a predetermined threshold value.

With such a structure, it can be said that line segments in the captured image are in a vicinity of a position in which the luminance change is large. However, when there are many positions in each of which the luminance change is large, the line segments are closely-spaced. Therefore, it is difficult to specify directions in which the line segments are oriented. By excluding, from selection targets, areas in each of which the luminance change is large, it is possible to skip an unnecessary processing of specifying the directions in which the closely-spaced line segments are oriented.

The judgment unit may judge that an area is suitable for estimating a tilt angle of the area when a variance of the directional distribution of the luminance gradients that has been obtained for the area is smaller than a predetermined value.

With such a structure, since the variance of the directional distribution of the luminance gradients reflects how random line segments included in the area are oriented, it is possible to select an area in which most of the line segments are oriented in the same direction by determining that an area having the small variance is an area suitable for estimating the tilt angle of the area.

In each area that has been judged to be suitable for estimating the tilt angle of the area, a ratio of the number of pixels whose luminance gradients fall in a predetermined angular range to the number of all pixels may be larger than a predetermined value. Here, the predetermined angular range is centered on a mode of the luminance gradients of all the pixels.

With such a structure, when the number of luminance gradients is concentrated around the mode in the directional distribution of the luminance gradients, values of tilt angles of most of the line segments are close to one another. Therefore, it is possible to select an area in which most of the line segments are oriented in the same direction by determining that an area in which the number of luminance gradients is concentrated around the mode in the directional distribution of the luminance gradients is suitable for estimating the tilt angle of the area.

The image processing device may continuously detect tilt angles of a plurality of captured images, and the predetermined angular range may be determined based on tilt angles of one or more of the captured images that have been previously obtained by the correction unit.

With such a structure, since it is assumed that the serially captured images are tilted at similar angles, the tilt angles of the captured images may be roughly guessed based on the tilt angles previously obtained by the correction unit. The angle range is determined based on the guessed tilt angle of the captured image. Thus, the accuracy of estimating the tilt angle can be incremented.

The predetermined angular range may be determined based on a tilt angle of one of the captured images that has been immediately previously obtained by the correction unit.

With such a structure, previously obtained tilt angles which are temporally distant from the tilt angle to be selected are unlikely to be captured under the same situation. The accuracy of estimating the tilt angle may be incremented by determining the angle range based on the immediately previously adopted tilt angle.

The judgment unit may judge that an area is suitable for estimating the tilt angle of the area when a variance of the directional distribution of the intensities of the luminance spectrums that has been obtained for the area is smaller than a predetermined value.

With such a structure, an area in which a variance of a directional distribution of the intensities of the luminance spectrums is small corresponds to an area included in the original image in which how random the line segments are oriented is small. Therefore, it is possible to select an area suitable for estimating the tilt angle.

The estimation unit may detect line segments included in all of the areas that are selected by the selection unit, and the tilt angle of the captured image may be a mode of tilt angles of the detected line segments.

With such a structure, since the estimation unit detects line segments from all of the selected areas, and estimates the tilt angle of the captured image, it is possible to complete the estimation of the tilt angle of the captured image by performing each of the line segment detection and the tilt estimation only once.

The estimation unit may detect line segments included in each of the selected areas. Also, a tilt angle of each of the selected areas may be a mode of tilt angles of the detected line segments included in the corresponding area, and the tilt angle of the captured image may be determined based on the tilt angles of the respective selected areas.

With such a structure, an accuracy of estimation may be increased by performing the line segment detection and the tilt angle estimation individually for each selected area, and further performing estimation of the tilt angle of the captured image based on the tilt angles of the areas.

The tilt angle of the captured image may be the mode of the tilt angles of the areas.

With such a structure, it is possible to estimate a tilt angle that seems to be most accurate by defining the mode of the estimated tilt angles of the respective areas as the tilt angle of the captured image.

When a plurality of modes of the tilt angles of the respective selected areas exist, one of the modes that is preferentially adopted as the tilt angle of the captured image may have longest line segments that tilt at a tilt angle of one of the selected areas.

When a plurality of modes exist, it is highly likely to estimate a right tilt angle by preferentially adopting a tilt angle of the longest line segment.

The image processing device may continuously correct tilts of a plurality of captured images, and when a plurality of modes of the tilt angles of the respective selected areas exist, one of the modes that is preferentially adopted as a tilt angle of each of the captured images may be closest to a tilt angle estimated based on tilt angles of one or more captured images that have been previously obtained by the correction unit.

When a plurality of modes exist, it is highly likely to estimate a right tilt angle by preferentially adopting a mode closest to a tilt angle estimated based on the previously obtained tilt angles.

The tilt angle estimated based on the tilt angles of estimated based on the tilt angles of the captured images previously detected by the estimation unit may be a tilt angle of the captured image that has been immediately previously obtained by the estimation unit.

When a plurality of modes exist, it is highly likely to estimate a right tilt angle by preferentially adopting a mode close to the immediately previously obtained tilt angle.

The image processing device may continuously correct tilts of a plurality of captured images, and when a ratio of the number of selected areas to the number of all areas that compose each of the captured images is smaller than a predetermined threshold value, the estimation unit may estimate a tilt angle of each of the captured images based on tilt angles of the captured images that have been previously obtained by the correction unit.

When a small number of areas is selected, the reliability of a tilt angle estimated based on such a small number of areas is low. Therefore, a tilt angle estimated based on the previously obtained tilt angles is adopted. Thus, it is possible to correct the captured image even when the small number of areas is selected.

The tilt angle of the captured image estimated by the estimation unit may be a tilt angle of a captured image that has been immediately previously obtained by the correction unit.

When the small number of areas is selected, the reliability of a tilt angle estimated based on such a small number of areas is low. Therefore, an immediately previously obtained tilt angle is adopted. Thus, it is possible to correct the captured image even when the small number of areas is selected.

The image processing device may be included in an imaging apparatus including a sensor that detects a tilt angle with respect to a horizontal plane at the time of capturing an image. When a ratio of the number of selected areas to the number of all areas that compose the captured image is smaller than a predetermined threshold value, the correction unit may correct the captured image with use of the tilt angle outputted by the sensor.

When the small number of areas is selected, the reliability of a tilt angle estimated based on such a small number of areas is low. Therefore, a tilt angle detected by the sensor at the time of capturing the image is adopted. Thus, it is possible to correct the captured image even when the small number of areas is selected.

When a ratio of the number of selected areas to the number of all areas that compose the captured image is smaller than a predetermined threshold value, the correction unit may not perform the correction.

When the small number of areas is selected, the reliability of a tilt angle estimated based on such a small number of areas is low. Therefore, the correction unit does not correct the captured image. Thus, it is possible to prevent deterioration in an image quality caused due to correction with use of a wrong tilt angle.

The image processing device may continuously correct tilts of a plurality of captured images, and when a ratio of the number of pixels whose luminances are each smaller than a predetermined threshold value to the number of all pixels composing each of the captured images is larger than a predetermined value, the correction unit estimates a tilt angle of each of the captured images based on tilt angles of captured images that have been previously obtained by the correction unit.

When the captured image is dark, it is difficult to estimate the tilt angle of such a dark image. Therefore, the tilt angle of the captured image may be estimated based on the previously obtained tilt angle. Thus, it is possible to correct the captured image even when the captured image is dark.

The tilt angle of the captured image may be a tilt angle of a captured image that has been immediately previously obtained by the correction unit.

When the captured image is dark, it is difficult to estimate the tilt angle of such a dark image. Therefore, the tilt angle of the captured image may be estimated based on the immediately previously obtained angle. Thus, it is possible to correct the captured image even when the captured image is dark.

The image processing device may be included in an imaging device including a sensor that detects a tilt angle with respect to a horizontal plane at the time of capturing an image, and when a ratio of the number of pixels whose luminances are each smaller than a predetermined value to the number of all pixels composing each of the captured images is larger than a predetermined threshold value, the correction unit may correct the captured image with use of the tilt angle outputted by the sensor.

When the captured image is dark, it is difficult to estimate a tilt angle of such a dark image. Therefore, a tilt angle detected by the sensor at the time of capturing the image is adopted. Thus, it is possible to correct the captured image even when the captured image is dark.

When a ratio of a number of pixels whose luminances are each smaller than a predetermined value to the number of all pixels composing of the captured images is larger than a predetermined threshold value, the correction unit may not perform the correction.

When the captured image is dark, it is difficult to estimate the tilt angle of such a dark image. Therefore, a correction is not performed. Thus, it is possible to prevent deterioration in an image quality due to a correction with use of a wrong tilt angle.

The sensor may be an acceleration sensor.

It is possible to detect gravity acceleration and detect a tilt angle at the time of capturing the image by using the acceleration sensor.

The sensor may be an angular velocity sensor.

It is possible to detect a rotation angle of the imaging apparatus, and detect a tilt angle at the time of capturing the image by using the angular velocity sensor.

BRIEF DESCRIPTION OF THE DRAWINGS

FIG. 6A and FIG. 6B each show a coefficient matrix used by a Sobel filter;

FIG. 8A, FIG. 8B, FIG. 8C, FIG. 8D, FIG. 8E and FIG. 8F;

DESCRIPTION OF NUMERAL REFERENCES

Figure 1:
FIG. 1 shows an example of how a user wears a wearable terminal including an image processing device which is an example of the present invention.

100: image processing device
110: image input unit
120: image division unit
125: direction judgment unit
130: area selection unit
140: tilt estimation unit
150: image correction unit
160: sensor

BEST MODE FOR CARRYING OUT THE INVENTION

The present embodiment describes a case where the image processing device that is an example of the present invention is included in a wearable terminal, and corrects a tilt of the image captured by a camera.

Figure 2A:
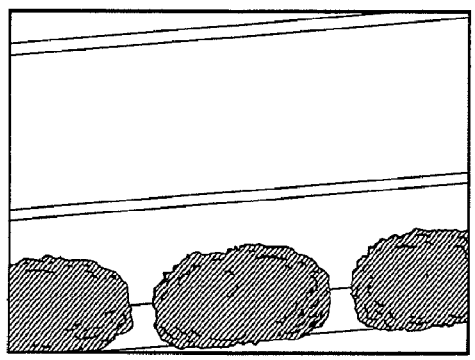
FIG. 2A, FIGS. 2B and 2C show an example of image correction processing by the image processing device which is an example of the present invention.
Figure 2B:
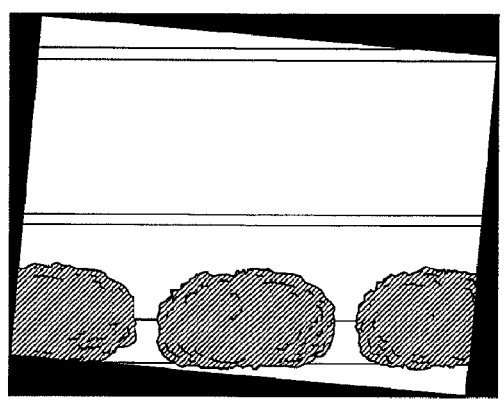

The wearable terminal is a terminal worn by the user (e.g. by dangling it around the neck) at all times, as shown in FIG. 1. The wearable terminal includes a camera, for example, for recording the daily life of the user. Images are captured by the camera without especially needing the operation by the user. Accordingly, images are likely to be captured at timing that is not expected by the user. When an image is captured with the camera tilted off the horizontal, for example, the captured image tilts as shown in FIG. 2A. Since such a tilted image does not look good, the user usually tries to correct the direction in which the object is oriented by tilting the captured image as shown in FIG. 2B. The present invention is an image processing device that estimates a right direction by analyzing the captured image to correct the tilt of the captured image without needing the user to correct the tilt of the captured image.

Figure 2C:

The image is considered to be tilted when a horizontal direction and a vertical direction of the captured image that can be judged by the object are not parallel to a horizontal direction and a vertical direction respectively that can be determined by a frame of the captured image. In the case of capturing an image of a wall as shown in FIG. 2A, a horizontal line can be easily estimated based on a pattern of the wall. Since it is detected that the captured image is tilted in an anticlockwise direction a little, it is easy to correct the captured image as shown in FIG. 2B. However, in the case of capturing an image of weed growing upon the ground as shown in FIG. 2C, it is difficult to estimate a horizontal direction based on an object. This is because line segments included in the captured image are randomly oriented, and line segments do not exist that indicate the horizontal direction or the vertical direction. The present invention is highly likely to estimate a right horizontal or vertical direction by analyzing a feature of an area in an image (i.e. whether it is easy or difficult to estimate a horizontal direction as stated in the above).

<<Structure>>

Figure 3:
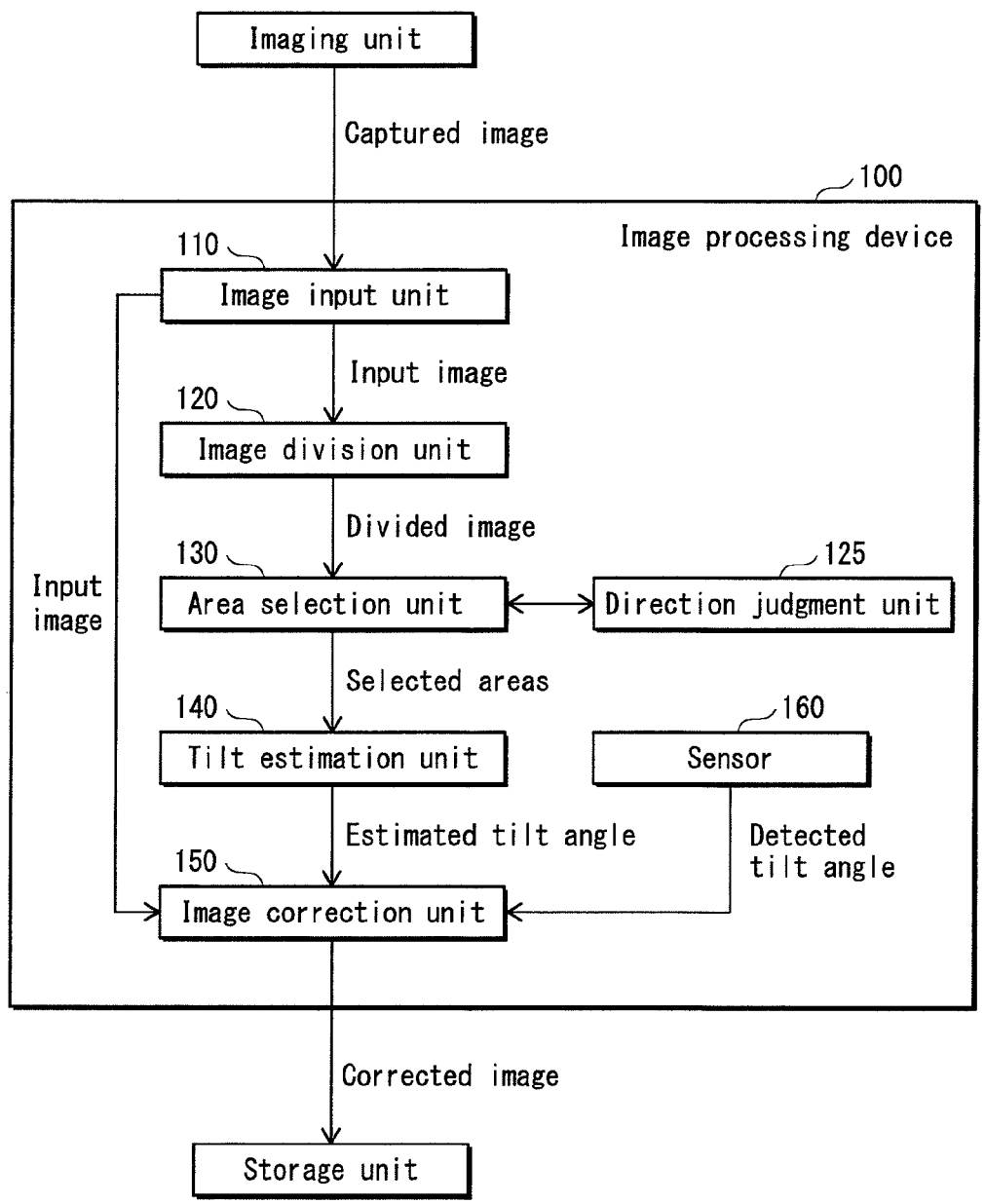
FIG. 3 shows a structure of the image processing device which is an example of the present invention.

FIG. 3 shows the structure of an image processing device which is an example of the present invention. An image processing device 100 which is an example of the present invention is composed of an image input unit 110, an image division unit 120, a direction judgment unit 125, an area selection unit 130, a tilt estimation unit 140, an image correction unit 150 and a sensor 160. In the present embodiment, the image processing device 100 which is an example of the present invention is included in the wearable terminal having an imaging unit and a storage unit, corrects a tilt of the captured image captured by the imaging unit, and stores the corrected image in the storage unit.

The imaging unit is a camera having an imaging device such as a CCD and CMOS sensor, captures an image, and outputs the captured image as an electrical signal.

The storage unit is a capturing medium such as an SD card or a flush memory, and stores an image outputted by the image processing device 100 which is an example of the present invention.

<Image Input Unit 110>

The image input unit 110 inputs an image to be corrected by the image processing device 100. The image processing device 100 which is the example of the present invention is not notified of when the captured image to be corrected was captured. Although the image processing device 100 which is the example of the present invention is included in the wearable terminal, and corrects the captured image instantly in the present embodiment, the image processing device 100 which is the example of the present invention may be prepared separately from an imaging apparatus, and the captured image may be input in the image processing device 100. It is presumed that an image to be input is an image whose vertical direction and horizontal direction are clearly stipulated, such as a rectangle photograph captured by a normal camera.

<Image Division Unit 120>

Figure 4A:
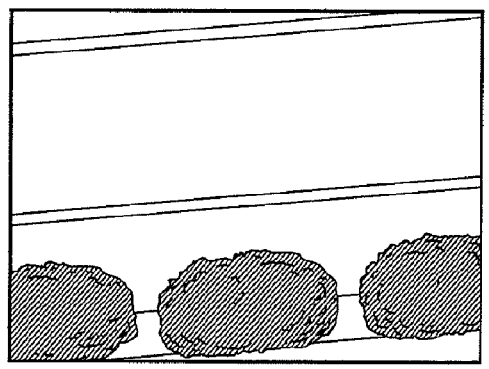
FIG. 4A, FIG. 4B and FIG. 4C describe an image division and an area selection by the image processing device which is an example of the present invention.
Figure 4B:
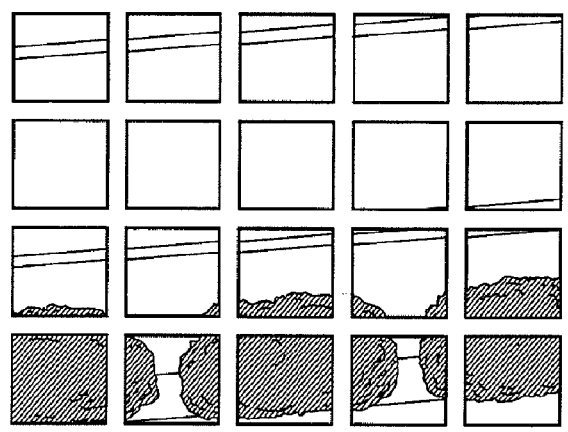

The image division unit 120 divides the input image into a plurality of areas. For example, the image division unit 120 may divide the input image by a ratio by dividing the input image into four equally-spaced areas horizontally and five equally-spaced areas vertically, for example. Alternatively, the image division unit 120 may divide the input image into areas each having a fixed size like a size of 32 horizontal and vertical pixels. For example, the image division unit 120 divides the input image as shown in FIG. 4A into 20 areas as shown in FIG. 4B.

In the present embodiment, a description is given on the assumption that the divided areas have the same surface area. However, the divided areas need neither to have the same surface area nor to be rectangle if the tilt estimation unit 140 estimates a tilt of the captured image in view of surface areas of the divided images.

<Direction Judgment Unit 125>

The direction judgment unit 125 judges whether each of the divided areas is suitable for estimating a tilt angle of the captured image. Whether each of the divided areas is suitable for estimating a tilt angle of the captured image is determined based on what proportion of line segments is oriented in the same direction in the areas. That is, an area in which most line segments are oriented in the same direction is suitable for estimating a tilt angle of the captured image, while an area in which line segments are randomly oriented is not suitable for estimating the tilt angle of the captured image.

Each of the line segments included in each area of the captured image can be quantitatively detected, as changes in luminances of the pixels, at the micro level. This is because areas are distinguished from one another by a difference in luminance, and a boundary between these areas is detected as a line segment. Accordingly, what proportion of line segments is oriented in the same direction in each area can be determined by judging whether or not directions in which the luminances of the pixels change in each area are random.

A pattern formed as a group of line segments detected by the difference in luminances of pixels is referred to as a texture. The direction judgment unit 125 judges whether or not a texture of each of the divided areas has a unidirectional characteristic. The unidirectional characteristic does not mean that all the line segments are oriented completely in the same direction but means that most of the line segments are oriented in almost the same directions between which differences are within a certain range. This range determines an accuracy of estimating the tilt of the captured image. A threshold value determined in a design process is used. Also, the edge strength may be obtained by pixel information such as a color difference as well as by the luminance.

(Luminance Gradients)

The following describes the method of determining a direction in which the luminance changes (i.e. the luminance gradient).

Figure 5A:
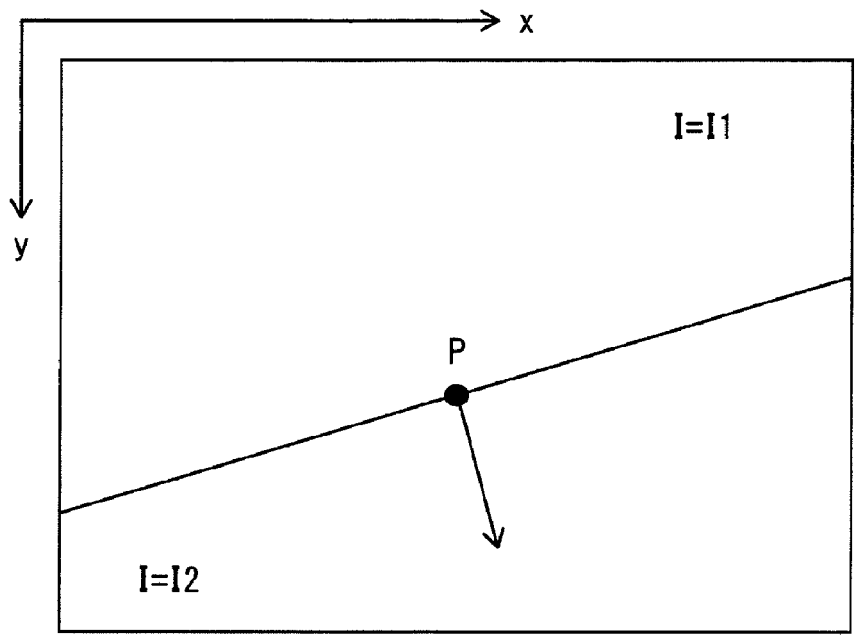
FIG. 5A and FIG. 5B describe a luminance gradient that exists at a point on a line segment.
Figure 5B:
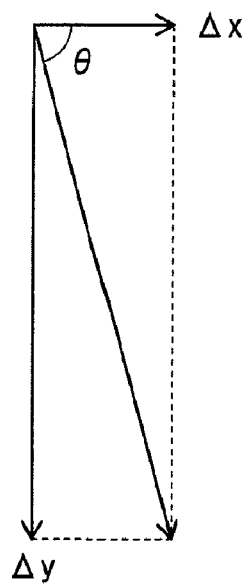

FIG. 5A and FIG. 5B describe luminance gradient of a point on the line segment. In FIG. 5A, a luminance $I=I_1$ in an area at the upper left, and a luminance $I=I_2$ in an area at the lower right, and $I_1<I_2$, it is indicated that a boundary between both of the areas is detected as a line segment. In FIG. 5A, when an origin is at an upper left end of the image, an x axis is oriented in the right direction, and a y axis is oriented in a downward direction, $\Delta x=\partial I(P)/\partial x$, and $\Delta y=\partial I(P)/\partial y$ where $\Delta x$ is a luminance change in an x direction at the position P(x, y), and $\Delta y$ is a luminance change in a y direction at the position P(x, y). In this case, $\theta=\tan^{-1}(\Delta y/\Delta x)$ is obtained with the luminance gradients $\theta$ being an inverse tangent of a ratio of $\Delta x$ to $\Delta y$ as shown in FIG. 5B. Since the luminance is constant on the line segment, the tilt of the line segment is $-\Delta x/\Delta y$ since $\delta I=0$. That is, the luminance gradient is along a direction orthogonal to the line segment. Here, $\theta=90°$ when $\Delta x=0$ and $\Delta y>0$, and $\theta=-90°$ when $\Delta x=0$ and $\Delta y<0$. When $\Delta x=0$ and $\Delta y=0$, a pixel is invalid.

If the luminance changes $\Delta x$ and $\Delta y$ are obtained from the luminance I(P) expressed by a discrete quadric function by simply adding values of the pixels, an error increases due to noise and the like included in the captured image. As a method for avoiding such a situation, there is a method of using the Sobel filter. In this method, a luminance gradient of a certain pixel is calculated by adding values obtained by weighting peripheral pixels that surround the certain pixels. FIG. 6A and FIG. 6B are coefficient matrixes used for the weighting in the method of using the Sobel filter. A matrix in FIG. 6A is used for performing a calculation for an x element, and a matrix in FIG. 6B is used for performing a calculation for a y element. When a matrix having elements as shown in FIG. 6A and a matrix having elements as shown in FIG. 6B are a and b, respectively, the luminance changes $\Delta x$ and $\Delta y$ at a position (n, m) are expressed as the following [Equation 5] and [Equation 6], respectively.

$$\Delta x(n, m) = \sum_{i=1}^{3} \sum_{j=1}^{3} a_{ij} I(n - 2 + i, m - 2 + j) \quad \text{[Equation 5]}$$

$$\Delta y(n, m) = \sum_{i=1}^{3} \sum_{j=1}^{3} b_{ij} I(n - 2 + i, m - 2 + j) \quad \text{[Equation 6]}$$

Note that although coefficient matrixes are 3-by-3 matrixes, larger matrixes may be used. Coefficient matrixes are generally square matrixes of (2k−1)×(2k−1) when k is an integer equal to or larger than two.

Figure 7:
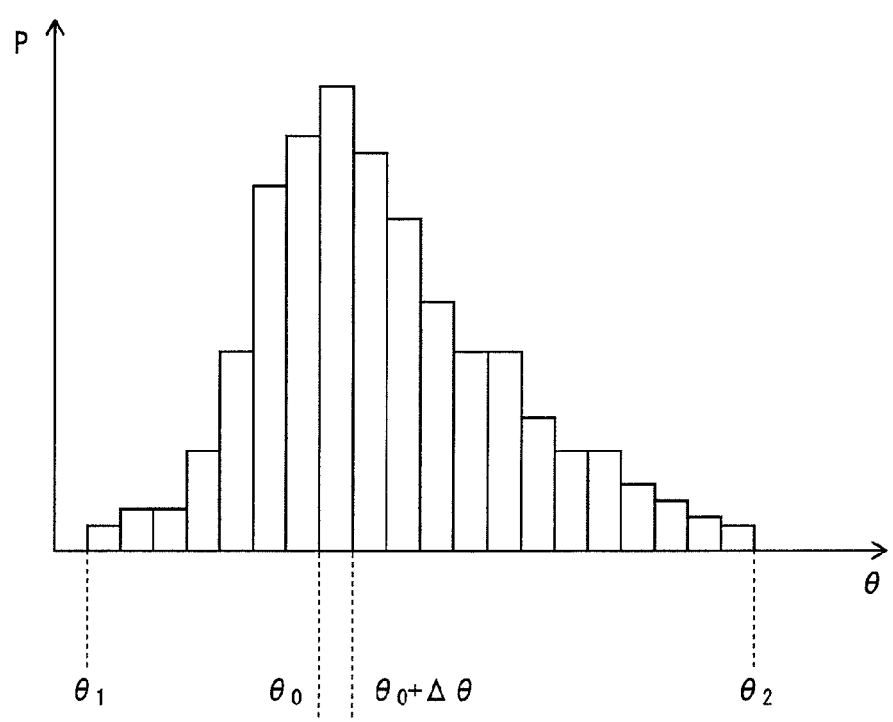
FIG. 7 shows a luminance gradient histogram generated by the image processing device which is an example of the present invention.

The area selection unit 130 calculates luminance gradients of all the pixels included in each area as shown in the above, and judges whether or not the line segments contained in the area are oriented in the same direction. This is performed by generating a luminance gradient histogram that shows a total number of pixels for each value of a luminance gradient as shown in FIG. 7. FIG. 7 is a histogram in which the luminance gradients θ are shown in a horizontal axis, and P which is the number of pixels having the luminance gradient in a certain range Δθ is shown in a vertical axis.

The direction judgment unit 125 generates the luminance gradient histogram as shown in the above. When the variance of the luminance gradient histogram is smaller than a predetermined threshold value, for example, the direction judgment unit 125 judges that the texture has a unidirectional characteristic. The criterion of this judgment is not limited to the variance of the luminance gradient histogram. Therefore, the direction judgment unit 125 may determine that most of the line segments are oriented in the same direction when the number of pixels whose luminance gradients each have an angle equal to or larger than a predetermined angle is larger than the predetermined threshold value.

In a case where there is no change in luminances in the area, all the pixels become invalid as a result of the calculations of the luminance gradients performed for the area by the selection unit 130. Therefore, the luminance gradient histogram cannot be generated. However, the direction judgment unit 125 determines that the texture of such an area does not have a unidirectional characteristic.

(Luminance Spectrums)

Meanwhile, the methods of determining the directional characteristics of the line segments included in the captured image includes a method that uses a frequency characteristic of the captured image in addition to the method of calculating the luminance gradient for each pixel.

That is, each of the luminances I(x, y) of pixels that compose the captured image is a discrete function that takes a certain value I(x, y) at discrete two-dimensional coordinates (x, y). The direction judgment unit 125 determines a direction based on a luminance spectrum obtained by performing two-dimensional discrete Fourier transform on the luminance I(x, y) of the captured image. When the width of the captured image is W, and the height of the captured image is H, the luminance spectrum FI(u, v) of the luminance I(x, y) of the captured image is expressed as the following [Equation 7].

$$FI(u, v) = \frac{1}{WH} \sum_{n=0}^{W-1} \sum_{m=0}^{H-1} I(n, m) e^{-\frac{i2\pi n u}{W}} e^{-\frac{i2\pi m v}{H}} \quad \text{[Equation 7]}$$

Figure 8A:
FIG. 8A, FIG. 8B, FIG. 8C, FIG. 8D, FIG. 8E and FIG. 8F show luminance spectrums corresponding to images.
Figure 8D:
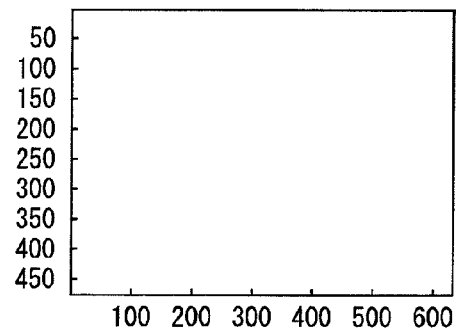
Figure 8B:
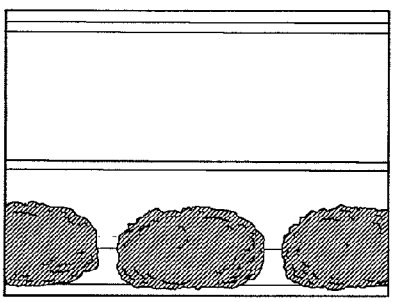
Figure 8E:
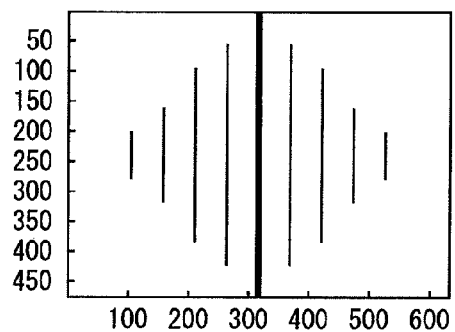
Figure 8C:
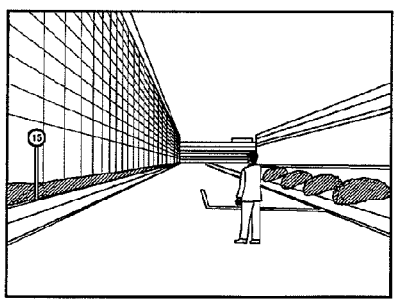
Figure 8F:
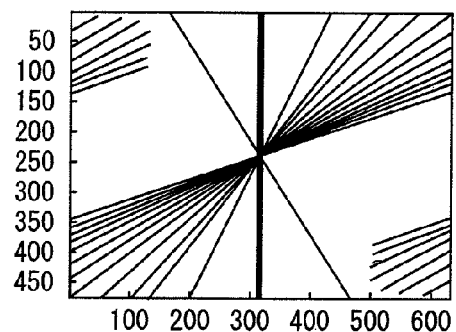

A description is given of how the directional characteristics of the line segments can be determined based on the luminance spectrums calculated in the above-mentioned manner, taking the images in FIG. 8A, FIG. 8B, FIG. 8C, FIG. 8D, FIG. 8E and FIG. 8F as examples. FIG. 8A, FIG. 8B and FIG. 8C are images of weed, a wall and a street, respectively. When the Fourier transform is applied to these images, the luminance spectrums as shown in FIG. 8D, FIG. 8E and FIG. 8F can be obtained. The luminance spectrums are shifted parallel such that direct current components are in the center of the captured image.

If a line segment does not exist that determines the direction of the captured image as shown in FIG. 8A, a strong peak does not appear in the luminance spectrum as shown in FIG. 8D. FIG. 8D shows the luminance spectrum as if it were flat. However, the luminance spectrum looks flat for the convenience of the drawing, and actually has slight rise and fall. It is difficult to estimate a tilt of such an image.

As shown in FIG. 8B, if a horizontal direction can be easily determined based on the pattern of the wall, the luminance spectrums show the strong peaks shown by lines in the vertical direction in FIG. 8E. In FIG. 8E, the intensities of the peaks are expressed by the thicknesses of the lines for the convenience of the drawing. Generally, the line segments in the original image and the peaks shown by the luminance spectrums are mutually orthogonal. Therefore, when the luminance spectrums show strong peaks in the vertical direction, it is estimated that the original image is highly likely to include line segments in the horizontal direction.

As shown in FIG. 8C, in the case of an image in which the street and buildings are captured, the luminance spectrums show a plurality of peaks in different directions in addition to a strong peak in the vertical direction as shown in FIG. 8F. This is because line segments of the building, a window, a wall and the like that face in various directions exist in the original image.

As described in the above, it is possible to determine directional characteristics of line segments included in the original image based on patterns of the luminance spectrums.

In order to quantitatively perform such a judgment, the direction judgment unit 125 calculates intensities P(θ) of luminance spectrums in each direction. That is, when coordinates (u, v) are expressed by polar coordinates (r, θ), the luminance spectrum intensity P(θ) in a certain direction θ is expressed by the following [Equation 8] as the sum of squares of the intensities FI(r, θ) that exist on a line extending in a radial direction.

$$P(\theta) = \sum_{r} |FI(r, \theta)|^2 \quad \text{[Equation 8]}$$

This distribution of the intensities of the luminance spectrums which is expressed as P(θ) is equivalent to the above-stated luminance gradient histogram since it is an intensity distribution in a direction of θ. Therefore, the direction judgment unit 125 is capable of determining the directional characteristic based on the information such as a variance of the distribution of the intensities of the luminance spectrums which is expressed as P(θ) as with the case of using the luminance gradient histogram.

<Area Selection Unit 130>

Figure 4C:
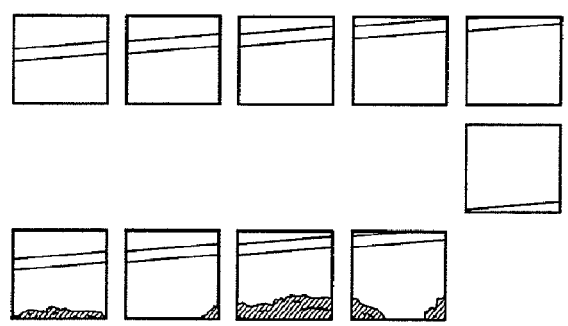

The area selection unit 130 selects only an area determined to have a unidirectional characteristic by the direction judgment unit 125 from among the areas divided by the image division unit 120. For example, in an example of FIG. 4C from among the examples shown in FIG. 4A, FIG. 4B and FIG. 4C, the area selection unit 130 selects areas in which horizontal lines of the wall are clearly shown while the area selection unit 130 does not select areas which entirely show a wall and do not have any texture, and areas which are mostly occupied by plants, and do not have textures having unidirectional characteristics.

(Operation of Area Selection Unit 130)

Figure 9:
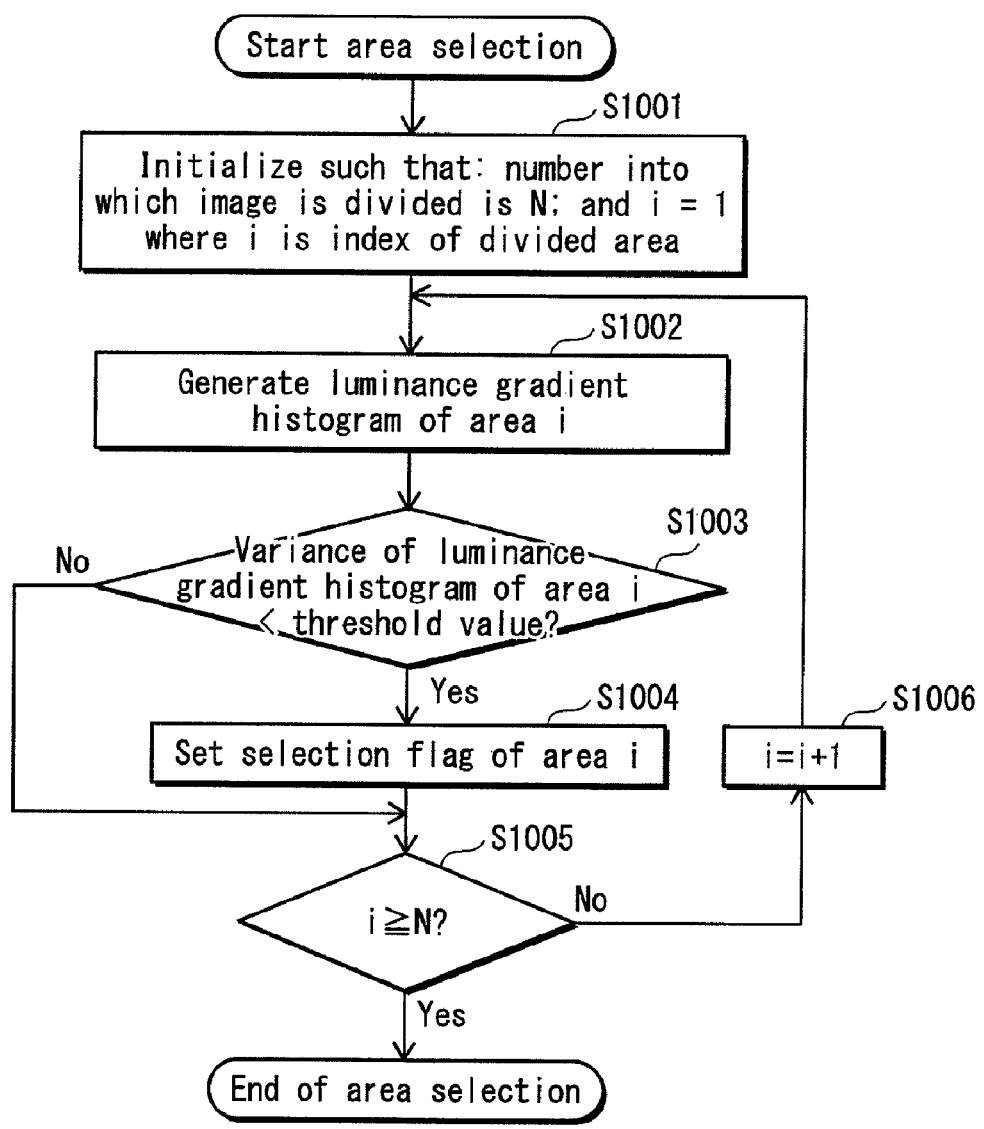
FIG. 9 shows a flowchart showing an operation of an area selection unit included in the image processing device which is the example of the present invention.

FIG. 9 is a flowchart showing an operation of the area selection unit 130 that performs area selection based on the directional judgments of the textures by the direction judgment unit 125. The area selection unit 130 performs initialization such that: the number of areas that have been divided by the image division unit 120 is N; and i=1 where i shows an index of each of the areas (Step S1001). Next, the area selection unit 130 instructs the direction judgment unit 125 to generate a luminance gradient histogram of an area i. Receiving the instruction from the area selection unit 130, the direction judgment unit 125 generates the luminance gradient histogram of the area i (Step S1002). If the variance of the luminance gradient histogram generated by the direction judgment unit 125 is smaller than the predetermined threshold value (Step S1003: Y), the area selection unit 130 sets the selection flag of the area i (Step S1004), and proceeds to Step S1005. If the variance of the luminance gradient histogram generated by the direction judgment unit 125 is equal to or more than the predetermined threshold value (Step S1003: N), the area selection unit 130 proceeds to Step S1005. If the index i showing the area is equal to or more than N which is the number of divided areas (Step S1006: Y), the area selection ends. If the index i showing the area is smaller than N which is the number of divided areas (Step S1006: Y), the area selection unit 130 increments i by one (Step S1007), and returns to Step S1002.

(Generation of Luminance Gradient Histogram)

Figure 10:
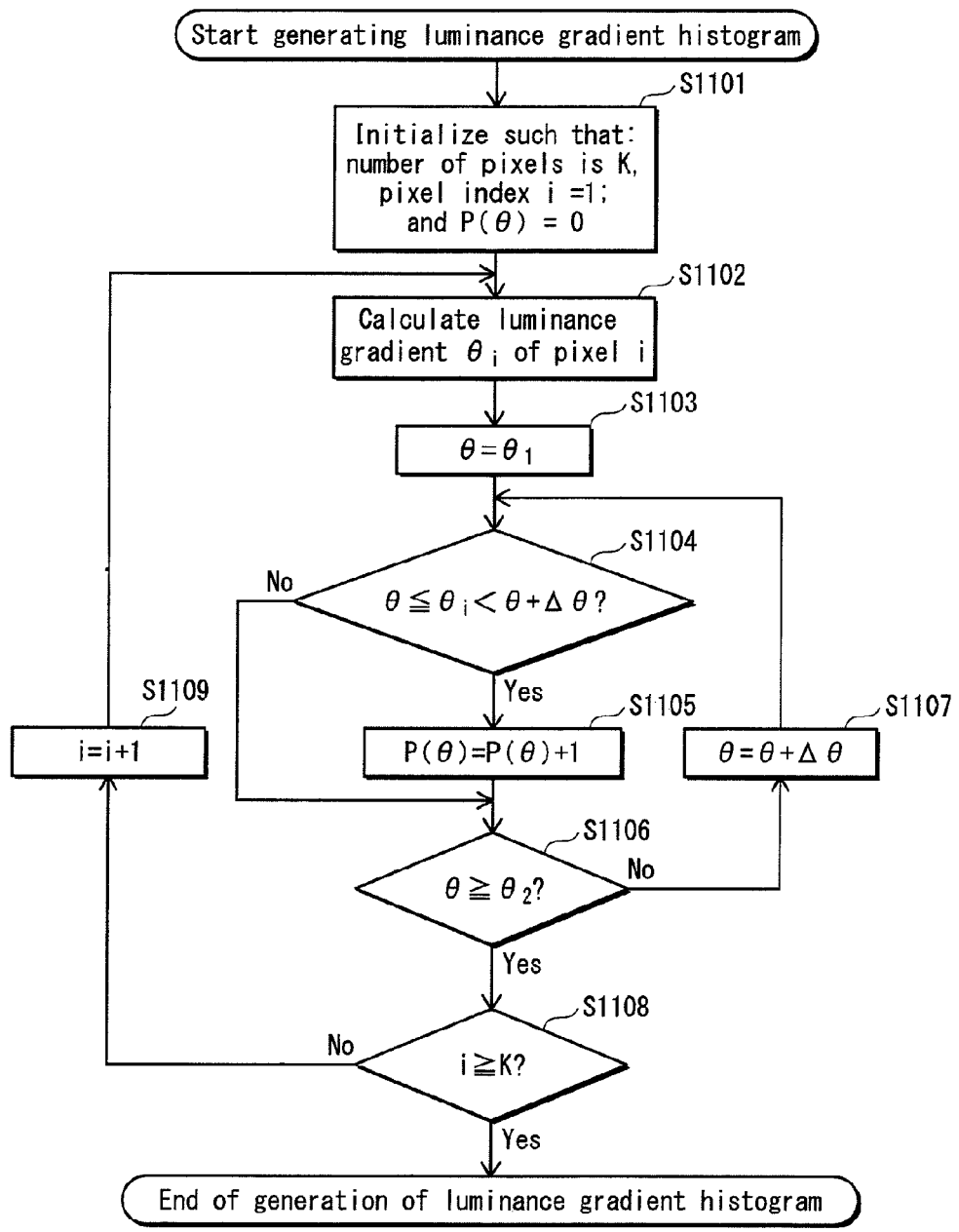
FIG. 10 shows a flowchart showing processing of generating the luminance gradient histogram of a direction judgment unit included in the image processing device which is the example of the present invention.

FIG. 10 is a flowchart showing how the direction judgment unit 125 performs generation processing of the luminance gradient histogram in the above-stated Step S1002.

Firstly, the direction judgment unit 125 performs initialization such that: the number of pixels included in the area is K; i=1 where i shows an index of each pixel; and $P(\theta)=0$ where $P(\theta)$ is the luminance gradient histogram (Step S1101). Next, the direction judgment unit 125 calculates the luminance gradient $\theta_i$ in the pixel i (Step S1102).

Next, the direction judgment unit 125 registers the calculated luminance gradients in the luminance gradient histogram. Firstly, a scanning start angle $\theta$ is $\theta_1$ ($\theta=\theta_1$) (Step S1103). If the luminance gradient $\theta_i$ of the pixel i falls in the range of $\theta$ and $\theta+\Delta\theta$ (Step S1104: Y), the direction judgment unit 125 increments $\theta$ of the luminance gradient histogram $P(\theta)$ by one (Step S1105), and proceeds to Step S1106. If the luminance gradient $\theta_i$ of the pixel i is not in the range of $\theta$ and $\theta+\Delta\theta$ (Step S1104: N), the direction judgment unit 125 proceeds to Step S1106. If the angle $\theta$ is equal to or larger than a scanning end angle $\theta_2$ (Step S1106: Y), the direction judgment unit 125 proceeds to Step S1108. When the angle $\theta$ is less than the scanning end angle $\theta$ (Step S1106: N), the direction judgment unit 125 increments $\theta$ by $\Delta\theta$ (Step S1107), and returns to Step S1104. This completes the registration of the pixel i in the luminance gradient histogram.

If the index i showing the pixel becomes equal to or larger than K which is the number of pixels included in the area (Step S1108: Y), the generation processing of the luminous gradient histogram ends. If K which is the number of pixels included in the area is less than K (Step S1108: N), the direction judgment unit 125 increments by one (Step S1109), and returns to Step S1102. This completes the generation of the luminance gradient histogram.

Note that although the direction judgment unit 125 scans all the pixels included in the area, and then generates the luminance gradient histogram in the above, it is necessary to exclude pixels at end portions of the area from processing targets, for example, when the Sobel filter is used since peripheral pixel information is necessary.

Also, since the luminance gradient histogram $P(\theta)$ indicates a data structure in which the total number of pixels that are within a certain range of $\theta+\Delta\theta$ and $\theta-\Delta\theta$. Therefore, it is not necessary to actually render a graph on a display and the like.

<Tilt Estimation Unit 140>

The tilt estimation unit 140 estimates, for the area selected by the area selection 130, a tilt angle of the area based on the pixel information. Firstly, the tilt estimation unit 140 detects line segments included in the area. Next, the tilt estimation unit 140 estimates the tilt angle of the area which is a mode of the tilt angles of the line segments. The tilt estimation unit 140 may estimate the tilt angle by detecting line segments included in all the areas selected by the area selection unit 130. Alternatively, the tilt estimation unit 140 may separately estimate a tilt angle of each of the areas selected by the area selection unit 130, and further estimate the tilt angle of the captured image based on the estimated tile angles of the areas.

(Line Segments Detection)

Figure 11A:
FIG. 11A, FIG. 11B and FIG. 11C describe a principle of line segment detection in the Hough transform method.
Figure 11B:
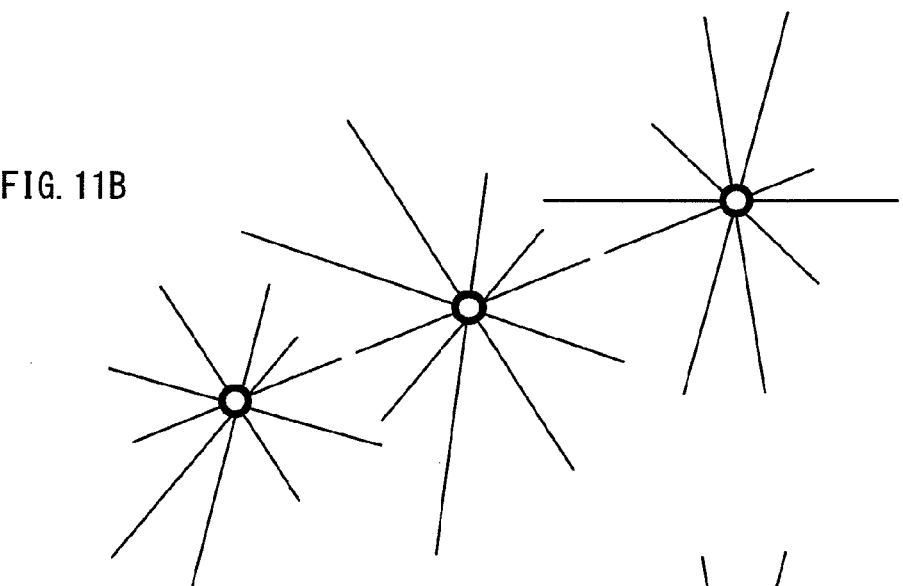
Figure 11C:
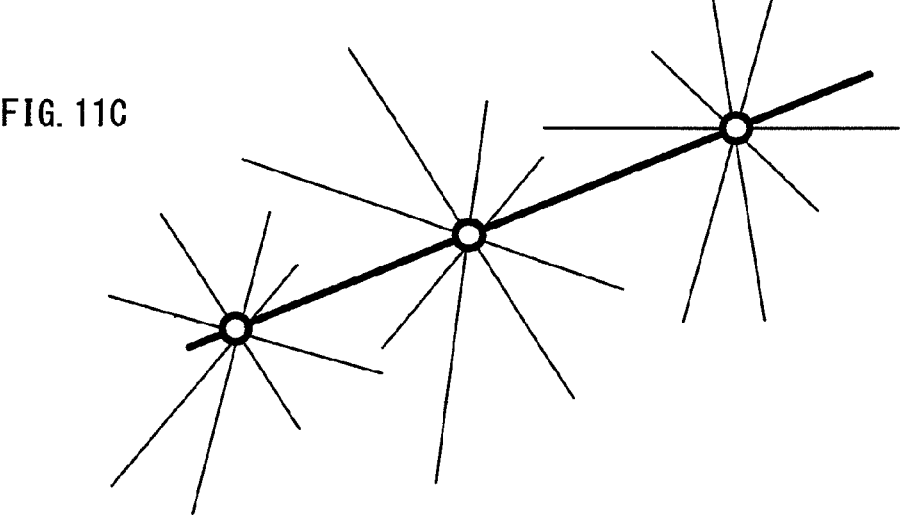

The tile angle estimation unit 140 uses the Hough transform method to detect line segments included in each area of the captured image. The Hough transform method is a detection method that makes use of a fact that it is highly likely that line segments actually exist in a case where: characteristic points are set at positions in each of the areas of the captured image in each of which line segments are highly likely to exist; and the lines extending from the respective characteristic points are connected supposing that there are straight lines that pass through the characteristic points in various directions with a fixed probability. For example, if it is supposed that straight lines extend from each characteristic point as shown in FIG. 11B in various directions when there are three characteristic points as shown in FIG. 11A, it is highly likely that a straight line exist on the straight line that connects the three characteristic points. Thus, it is assumed that the line segment actually exists. The characteristic points are extracted by applying the edge detection filter such as the above-stated Sobel filter on each of the areas of the captured image.

When a coordinate of the $i^{th}$ characteristic point is $(x_i, y_i)$, all the straight lines that pass through this characteristic point may be expressed as the following [Equation 9].

$$x \cos\theta + y \sin\theta = \rho \quad (\rho = x_i \cos\theta + y_i \sin\theta) \quad \text{[Equation 9]}$$

Figure 12A:
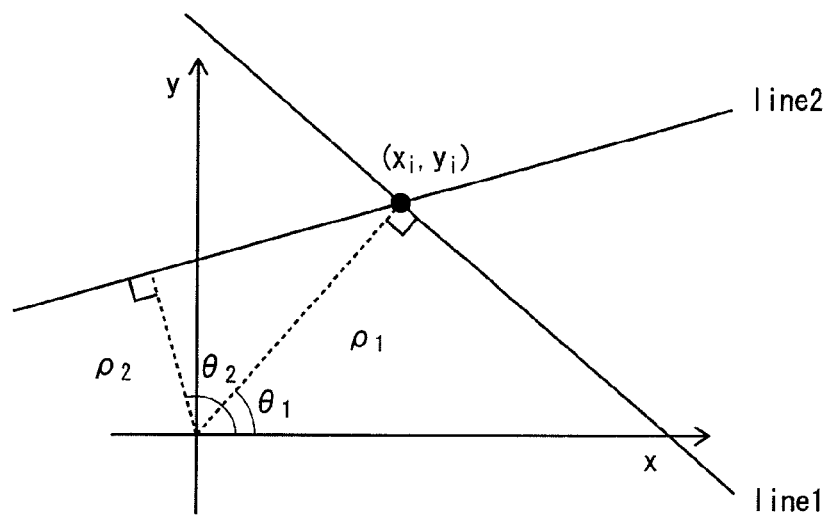
FIG. 12A and FIG. 12B describe parameters characterizing the line segments in the Hough transform method.
Figure 12B:
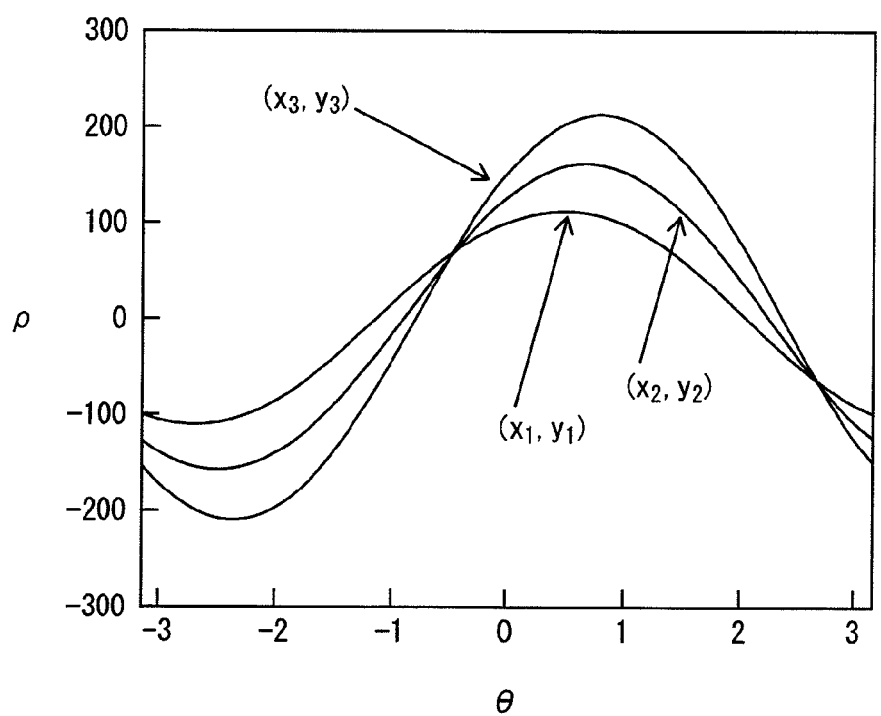

The parameters $\theta$ and $\rho$ have geometric meanings that are: angles made by perpendiculars that extend straight from the origin, and an x axis; and a distance between a point on the straight line to the origin, respectively. Since there is a restriction that a straight line should pass through the characteristic points $(x_i, y_i)$, the parameters $\theta$ and $\rho$ are not independent. Therefore, when $\theta=\mu\theta_1, \rho=\rho_1$, and a line 1 is determined, for example. Also, when $\theta=\theta_2, \rho=\rho_2$, and a line 2 is determined, for example. These are illustrated in FIG. 12B. FIG. 12B plots the relationship between $\theta$ and $\rho$ with respect to three characteristics $(x_i, y_i)$ (i=1, 2, 3) when a horizontal axis shows $\theta$ and a vertical axis shows $\rho$. In FIGS. 12A and 12B, a point at which two different curves intersect indicates the same straight line that passes through two different characteristics (i.e. a straight line that connects two characteristics). Similarly, when three different curves intersect at one point, it is indicated that three different characteristic points are on the same straight line.

In the Hough transform method, a sum of straight lines that are formed by parameters $(\theta, \rho)$, and pass through a characteristic point is obtained for each characteristic point, and a straight line having a figure that exceeds a predetermined threshold value $P_0$ is detected as a straight line that actually exists.

(Tilt Angle Estimation)

The tilt angle estimation unit 140 obtains a sum of tilt angles of the detected line segments included in the respective areas, and estimates an angle having the highest tilt angle as a tilt angle of the area.

Since the parameter $\theta$ detected in the above-stated line segment detection is an angle made by a perpendicular that extends straight from the origin; and the x axis, an angle made by the straight line and a horizontal direction of the captured image can be expressed by $\phi=\theta-90°$. The tilt angle estimation unit 140 generates, for targeting all the line segments detected in the area, an angle histogram regarding tilt angles, and defines a mode of the tilt angles φ as a tilt angle of the area.

Figure 14:
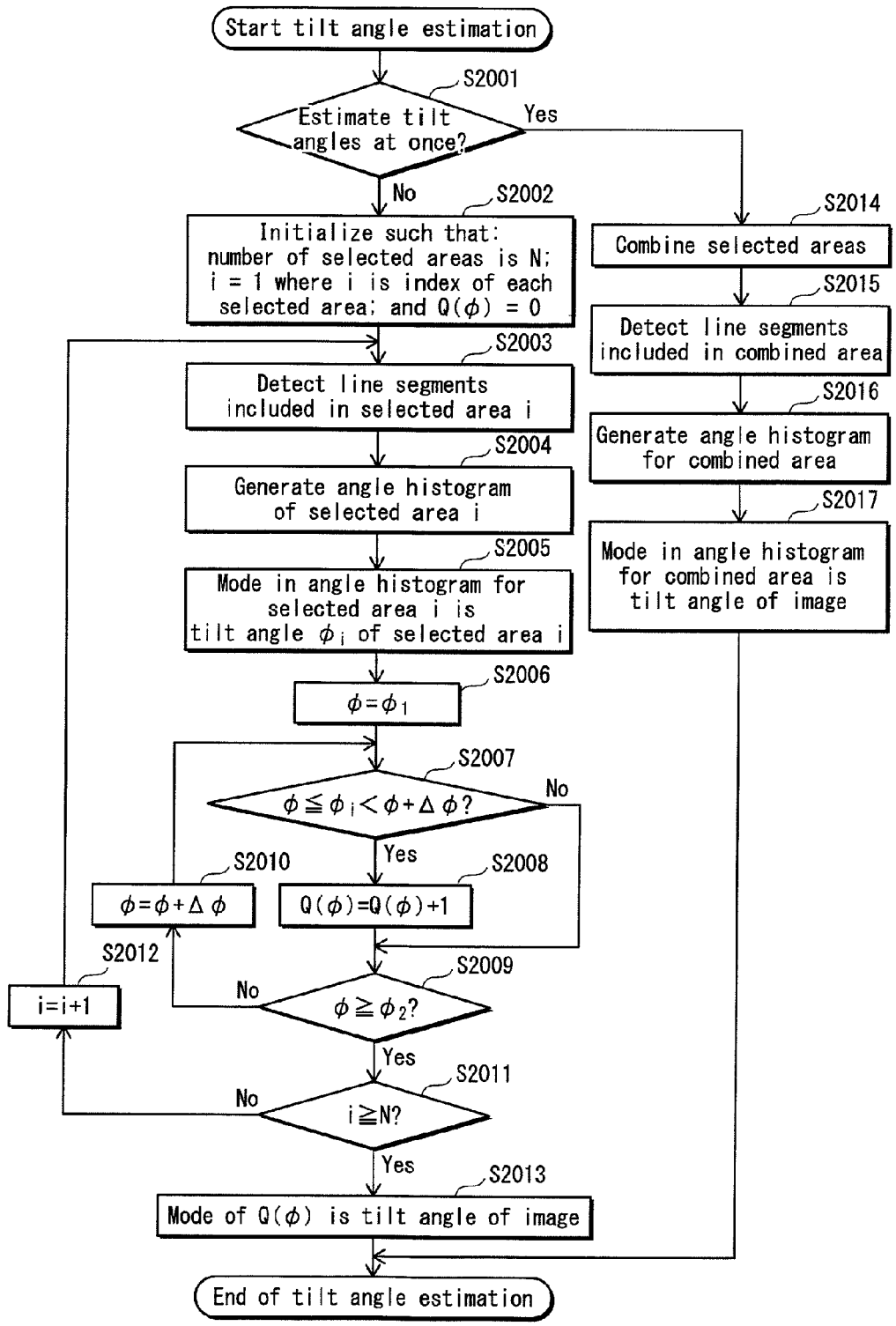
FIG. 14 shows a flowchart showing an operation of the tilt estimation unit included in the image processing device which is an example of the present invention.

FIG. 14 is a flowchart showing the operation of the tilt estimation unit 140.

If the tilt estimation unit 140 detects line segments from all the areas selected by the area selection unit 130, and estimates a tilt angle of the captured image at once (Step S2001: Y), the tilt estimation unit 140 proceeds to Step S2014. If not (Step S2001: N), the tilt estimation unit 140 proceeds to Step S2002, and performs initialization such that: the number of selected areas is N; i=1 where i shows an index of each area; and Q(φ)=0 where Q(φ) is a histogram of the tilt angles φ of the areas.

The following describes processing of registering the tilt angle of each area in a histogram Q(φ). Firstly, the tilt estimation unit 140 generates an angle histogram in the area i (Step S2004), and defines a mode in the angle histogram as a tilt angle $φ_1$ of the area i (Step S2005). If the scanning start angle φ is set to $φ_1$ (φ=$φ_1$) (Step S2006), and a tilt angle $φ_i$ of the area i falls in the range of φ and φ+Δφ (Step S2007: Y), the tilt estimation unit 140 increments Q(φ) by one (Step S2008), and proceeds to Step S2009. The tilt estimation unit 140 sets a scanning start angle φ to $φ_1$ (φ=$φ_1$) (Step S2006), and proceeds to Step S2009 if the tilt angle $φ_1$ of the area i falls in the range of φ and φ+Δφ. If the angle φ is equal to or larger than a scanning end angle $φ_2$ (φ≧$φ_2$) (Step S2009: Y), the tilt estimation unit 140 proceeds to Step S2011, and proceeds to Step S2010 while φ<$φ_2$, increments φ by Δφ (Step S2010), and returns to Step S2007.

The tilt estimation unit 140 performs the above-stated processing on all the areas. If the index i of the area is equal to or larger than N which is the number of selected areas (i≧N) (Step S2011: Y), the tilt estimation unit 140 proceeds to Step S2013. Finally, the tilt estimation unit 140 selects a mode in the generated histogram Q(φ), and defines the mode as an estimation value of the tilt angle of the captured image (Step S2013).

When it is judged that the tilt estimation unit 140 estimates tilt angles of the areas at once in Step S2001, the tilt angle estimation unit 140 combines all the areas selected by the area selection unit 130 into one area (Step S2014). The tilt estimation unit 140 detects line segments for the combined area (Step S2015), and generates an angle histogram for the combined area (Step S2016). The tilt estimation unit 140 defines the mode in the angle histogram as an estimation value of a tilt angle of the area (Step S2017).

This concludes the operation of the tilt processing by the tilt estimation unit 140.

Next, a description is given of line segment detection processing in Step S2003 and Step S2015.

Figure 15:
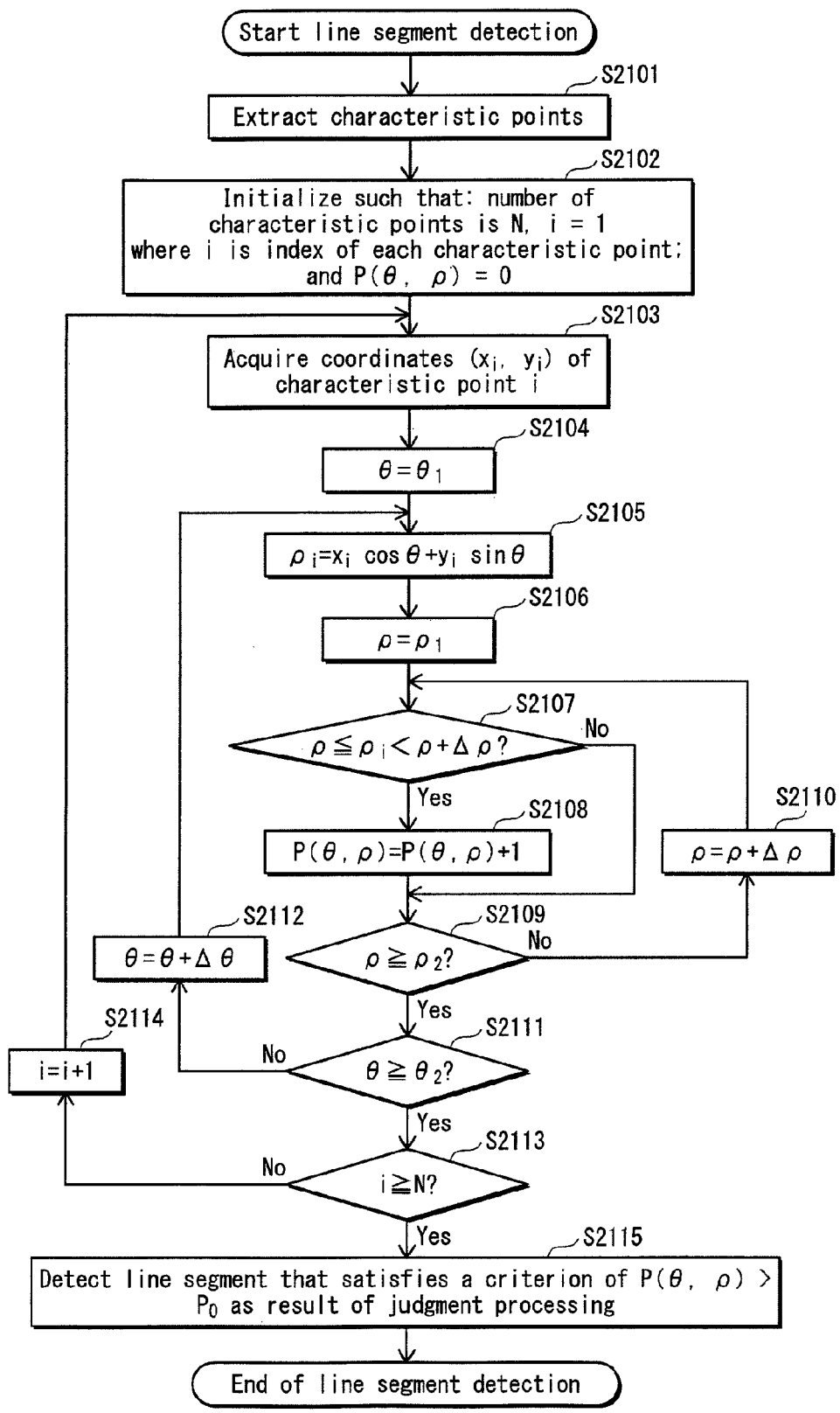
FIG. 15 shows a flowchart showing an operation of the line segment detection processing performed by the tilt estimation unit included in the image processing device which is an example of the present invention.

FIG. 15 is a flowchart showing the line segment detection in the Hough transform method.

The tilt estimation unit 140 extracts characteristic points from the area (Step S2101), and performs initialization such that: the number of characteristic points is N; i=1 where i shows an index of each characteristic point; and P(θ, ρ)=0 where P(θ, ρ) is a histogram of pairs of parameters θ and ρ (Step S2102).

The following describes how to find out which block a straight line that passes through a characteristic point i belongs to when an area that falls in a range of $θ_1$ and $θ_2$ and in a range of $ρ_1$ and $ρ_2$ in space θ−ρ is divided into ΔθΔρ blocks. Firstly, the tilt estimation unit 140 acquires coordinates ($x_i$, $y_i$) of the characteristic point i (Step S2103). The tilt estimation unit 140 performs initialization such that a parameter θ is $θ_1$ (Step S2104); and calculates $ρ_i$ that corresponds to θ (Step S2105). The tilt estimation unit 140 performs initialization such that a parameter ρ is $ρ_1$ (Step S2106). If $ρ_1$ falls in the range of ρ and ρ+Δρ (Step S2107: Y), the tilt estimation unit 140 increments P(θ, ρ) by one (Step S2108), and proceeds to Step S2109. If $ρ_1$ does not fall in the range of ρ and ρ+Δρ (Step S2107: N), the tilt estimation unit 140 proceeds to Step S2109. The tilt estimation unit 140 scans in a ρ direction while increasing ρ by Δρ (Step S2110) until ρ reaches $ρ_2$ (Step S2109: N). When ρ reaches $ρ_2$ (Step S2109: Y), the tilt estimation unit 140 scans in a θ direction while increasing θ by Δθ (Step S2112) until θ reaches $θ_2$ (Step S2111: N). When θ reaches $θ_2$ (Step S2111: Y), a registration of the characteristic point i in a histogram R(θ, ρ) completes.

The tilt estimation unit 140 performs the above-stated processing until the index i reaches N which is the number of characteristic points (Step S2113: N) while incrementing i by one. When the index i reaches N which is the number of characteristic points (Step S2113: Y), the tilt estimation unit 140 detects, as a line segment that actually exists, a line segment expressed by (θ, ρ) whose number of pairs of parameters θ and ρ is larger than a threshold value $P_0$ in the histogram P(θ, ρ).

Figure 16:
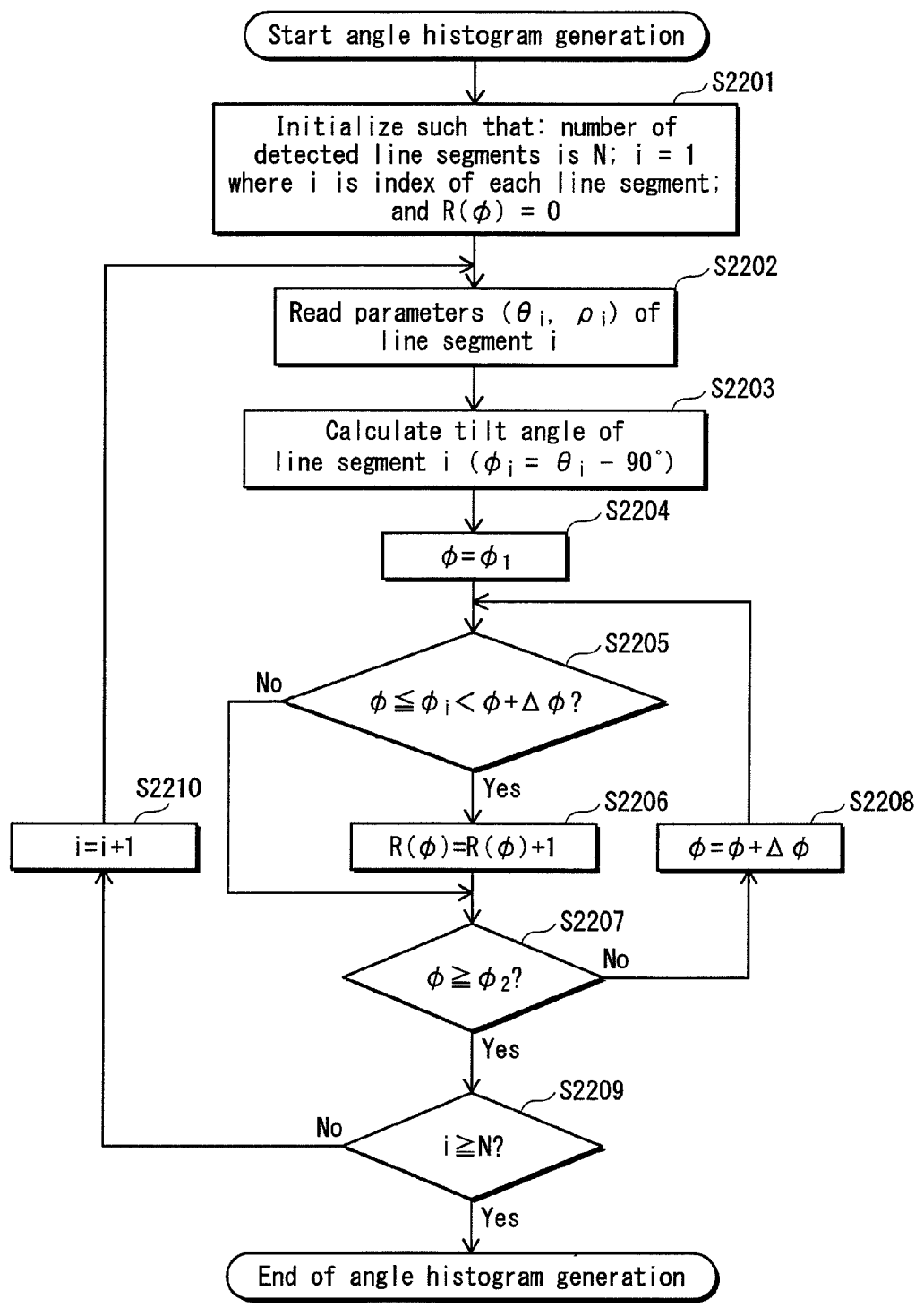
FIG. 16 shows a flowchart showing an operation of an angle histogram generation processing performed by the tilt estimation unit included in the image processing device which is the example of the present invention.

FIG. 16 is a flowchart of the angle histogram generation. The tilt estimation unit 140 performs initialization such that: the number of line segments detected in each area is N; i=1 where i shows an index of each line segment; and R(φ)=0 where R(φ) is an angle histogram (Step S2201). Next, the tilt estimation unit 140 reads, from a memory, parameters ($θ_i$, $ρ_i$) calculated when detecting a line segment i (Step S2202), and calculates a tilt angle $φ_i$ of the line segment i (Step S2203).

Next, the tilt estimation unit 140 registers the tilt angle $φ_i$ in the angle histogram R(φ). Firstly, the tilt estimation unit 140 sets a scanning start angle φ to $φ_1$ (φ=$φ_1$) (Step S2204). If the tilt angle $φ_i$ of the line segment i falls in the range of φ and φ+Δφ (Step S2205), the tilt estimation unit 140 increments a value of R(φ) by one (Step S2205: Y), and proceeds to Step S2206. If the tilt angle $φ_i$ of the line segment i does not fall in the range of φ to φ+Δφ (Step S2205: N), the tilt estimation unit 140 proceeds to Step S2206. If the angle φ is equal to or larger than a scanning end angle $φ_2$ (Step S2206: Y), the tilt estimation unit 140 ends the registration of the tilt angle $φ_i$, and proceeds to Step S2209. If the angle φ is smaller than a scanning end angle $φ_2$ (Step S2206: N), the tilt estimation unit 140 increments the angle φ by Δφ (Step S2208), and returns to Step S2205.

The tilt estimation unit 140 performs the above-stated processing on all of the line segments. That is, if the index i is equal to or larger than N which is the number of line segments (Step S2209: Y), the tilt estimation unit 140 ends the generation of the angle histogram. When the index i is smaller than N which is the number of line segments (Step S2209: N), the tilt estimation unit 140 increments the index i by one (Step S2210), and returns to Step S2202.

Figure 13:
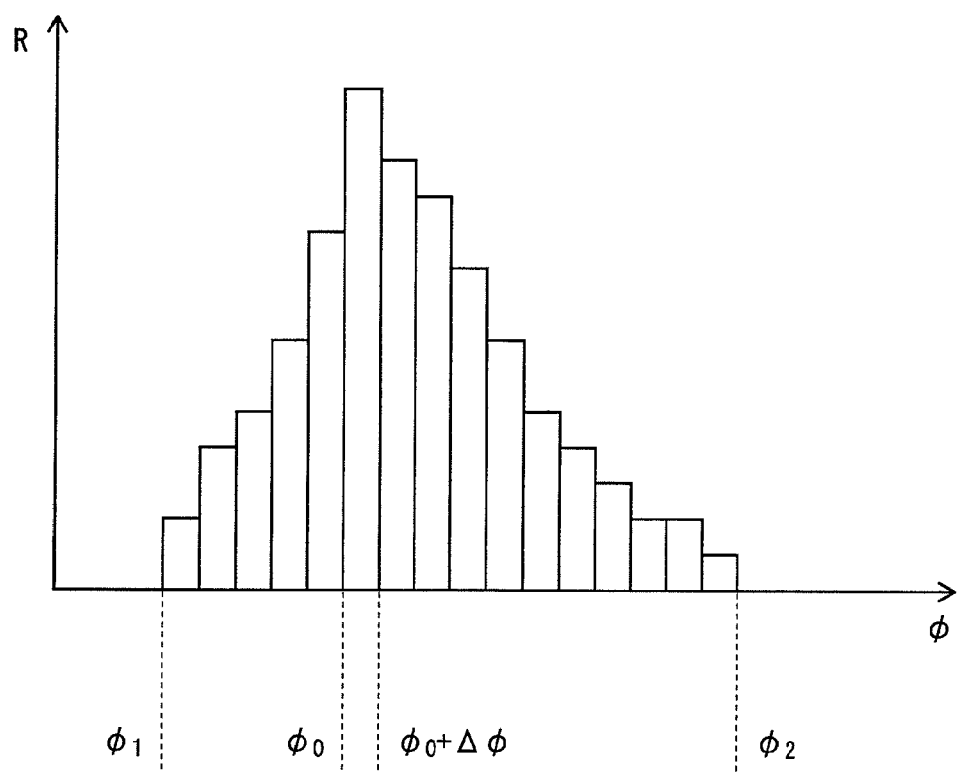
FIG. 13 shows an angle histogram generated by a tilt estimation unit included in the image processing device which is the example of the present invention.

This completes the angle histogram as shown in FIG. 13. The tilt estimation unit 140 estimates that a tilt angle of the area is the mode in the angle histogram. For example, the tilt angle of the area is $φ_0$ in the case of FIG. 13.

When the tilt estimation unit 140 estimates the tilt angle of the captured image by detecting line segments from all the areas selected by the area selection unit 130, the above-mentioned tilt angle of the area is a tilt angle of the captured image. In a case where the tilt estimation unit 140 estimates a tilt angle separately for each area, and further estimates the tilt angle of the captured image, the tilt estimation unit 140 estimates the tilt angle of each area as shown in the above, generates a histogram of the tilt angles of the areas and estimates that the tilt angle of the captured image is a mode of the tilt angles of the areas.

Although all the angles are processed in the same manner during the generation of the angle histogram in the above, the tilt estimation unit 140 may generate the angle histogram after weighting the angles, depending on tilt angles estimated by a method different from the image analysis. For example, when a plurality of images are captured serially, it is expected that tilt angles also change serially. Therefore, it is possible to improve the accuracy of the estimation by estimating the tilt angle of the captured image based on past tilt angles, adding, to the angle, a weight corresponding to the value, and generating an angle histogram. On the premises that the imaging apparatus is not shaken violently, an immediately preceding tilt angle is considered to be closest to a current tilt angle from among the past tilt angles. When the immediately previously obtained tilt angle is $\theta_{prev}$, a weight $w(\theta)$ as shown in [Equation 10] may be added in accordance with the tilt angles $\theta$.

$$w(\theta) = \begin{cases} \cos(\theta - \theta_{prev}) & (\cos(\theta - \theta_{prev}) > 0) \\ 0 & (\cos(\theta - \theta_{prev}) \leq 0) \end{cases}$$ [Equation 10]

Also, when there are a plurality of modes in the angle histogram, a tilt that seems accurate may be estimated by adding weights in accordance with characteristics of the line segments. For example, while a short line segment is likely to be fine patterns drawn on the wall, for example, a long line segment is highly likely to be a part of the structure of the wall such as an edge of the wall. By adding a larger weight to the tilt angle formed by the long line segment than to a tilt angle formed by the short line segment, the tilt estimation unit 140 can detect a horizontal direction or a vertical direction more accurately, and estimate the tilt angle of the captured image correctly. The length of each line segment is a distance between two furthest characteristic points from among the characteristic points through which the line segment detected in the Hough transform method passes.

Also, a weight may be preferentially added to tilt angles formed by line segments that extend in the vertical direction rather than in the horizontal direction. This is because line segments in the captured image are more likely to tilt in the horizontal direction than in the vertical direction due to the perspective. For example, all of the line segments each indicating the horizontal line of the building on the left and right of the captured image as shown in FIG. 8C are actually parallel to the horizontal plane. However, the line segments appear to be radically arranged in the captured image due to the perspective, and tilt in the slightly different directions from one another. The line segments indicating the vertical direction, on the other hand, are always parallel to the vertical direction in the captured image. In view of these facts, it is effective to add weights that depend on the directions in which the line segments are oriented.

(Tilt Estimation Using Luminance Spectrums)

Although a description is given of the method in which the tilt estimation unit 140 detects the line segments from each area, and estimates the tilt angle of the area using the tilt angles of the line segments, the tilt estimation unit 140 may estimate the tilt angle with use of the luminance spectrums of the area.

Figure 17A:
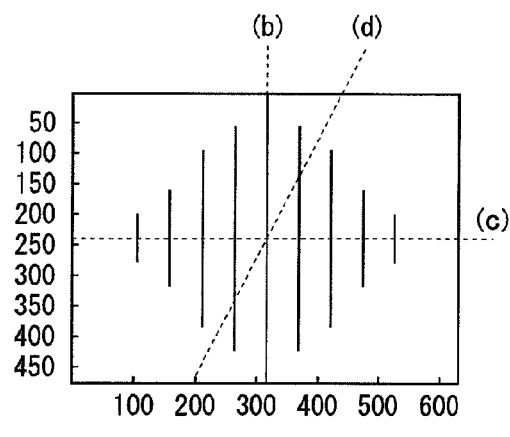
FIG. 17A, FIG. 17B, FIG. 17C and FIG. 17D show cross sections of the luminance spectrums in FIG.
Figure 17C:
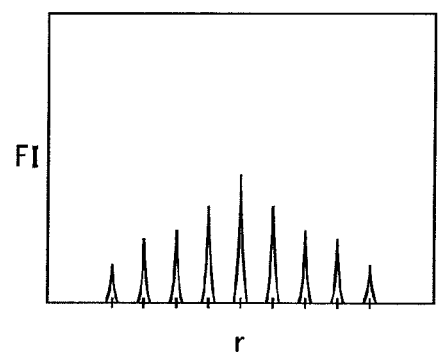
Figure 17B:
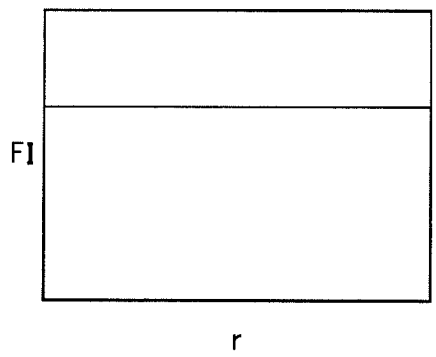
Figure 17D:
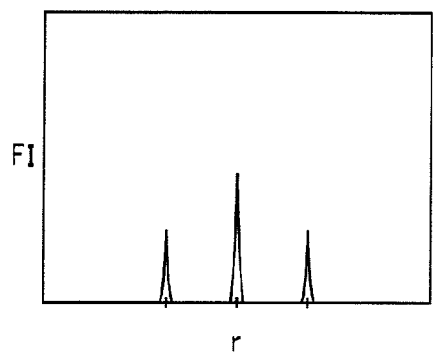

For example, in the luminance spectrum in FIG. 17A, the cross sections in directions shown by (b), (c) and (d) are shown in 17B, 17C and 17D, respectively. Since a line shown by (b) passes on the peak oriented in the vertical direction in the center of FIG. 17A, a strong signal extends flat without a peak. Since a line shown by (c) is oriented in a direction that crosses the vertical line in FIG. 17A, there are a lot of peaks. Since a line shown by (d) is oriented in the direction between (b) and (c), an interval between peaks are wider than (c).

In view of the above, a direction in which the luminance spectrums are intense is a direction in which a few peaks exist, the angle histogram may be generated based on the inverse of the number of peaks.

(Tilt Estimation Based on Directional Distribution of Luminance Gradients)

Also, the tilt estimation unit 140 may estimate the tilt angle based on the directional distribution of the luminance gradients. Specifically, the tilt estimation unit 140 may calculate a directional distribution of the luminance gradients of pixels that belong to each area selected by the area selection unit 130, and estimate the tilt angle with use of an angle corresponding to a mode of the luminance gradients.

(Sensor 160)

The sensor 160 detects a direction of a weight of an acceleration sensor or an angular velocity sensor. When the tilt estimation unit 140 fails to estimate the tilt angle of the captured image, the tilt estimation unit 140 detects the tilt angle of the wearable terminal directly by the sensor 160. Examples of the cases where the tilt estimation unit 140 fails to estimate the tilt angle of the captured image are: a case where the small number of areas are selected by the area selection unit 130; and a case where the captured image is dark.

The tilt estimation unit 140 detects line segments from the selected areas, and estimates the tilt angle of the captured image. Accordingly, in a case where a small number of areas having line segments oriented in the same direction exists in the captured image, the tilt estimation unit 140 cannot estimate the tilt angle of the captured image accurately and as a result the number of selected areas is small. Also, since the tilt estimation unit 140 estimates the tilt angle of the captured image based on the luminance, the tilt estimation unit 140 cannot estimate the tilt angle of the captured image accurately when the captured image as whole is dark. In such a case, the tilt angle detected by the sensor 160 reflects the tilt angle of the captured image more accurately than the tilt angle of the captured image estimated by the tilt estimation unit 140.

The sensor 160 uses a biaxial acceleration sensor so as to detect accelerations in two directions that are perpendicular to the image-capturing direction of the camera of the wearable terminal simultaneously with use of a sensor such as a piezoresistive acceleration sensor that converts an applied acceleration into an electrical signal, for example.

Figure 18:
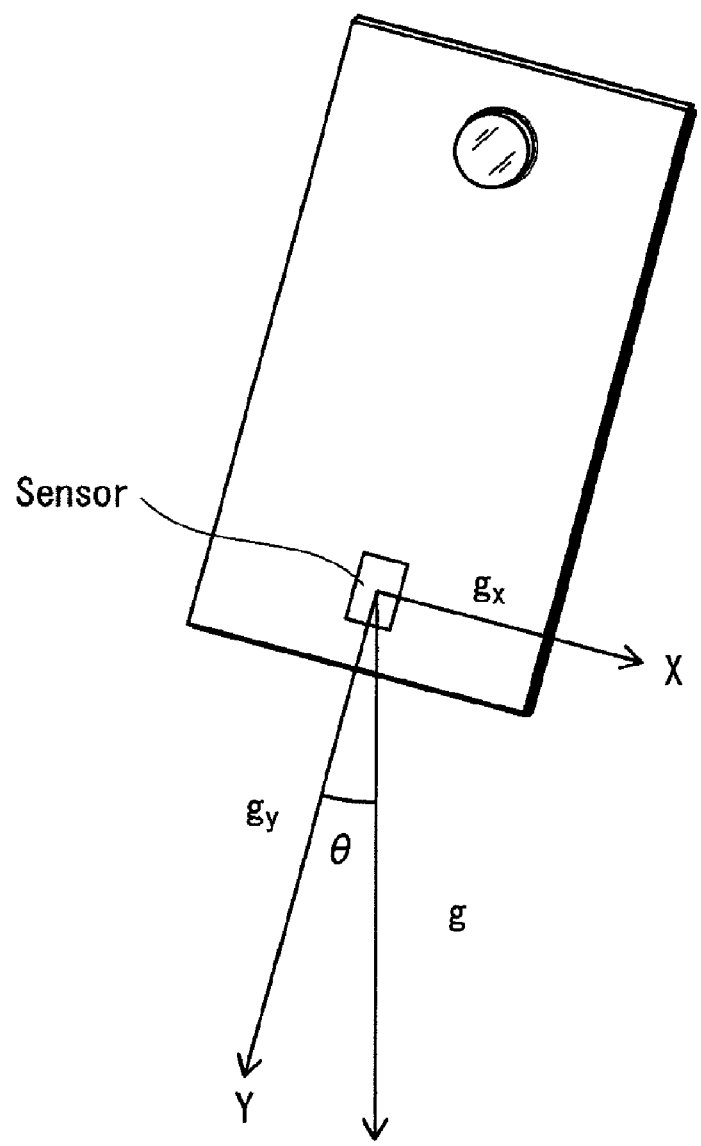
FIG. 18 describes a tilt angle detection method with use of a sensor included in the image processing device which is the example of the present invention.

As shown in FIG. 18, the sensor 160 is fixed on the wearable terminal such that the sensor 160 can detect the acceleration in the x direction and the y direction with a y axis and an x axis indicating in the vertical direction and the horizontal direction respectively when the wearable terminal is not tilted. When a weight acceleration is g, the elements in the x direction and the y direction can be expressed as $g_x = g \sin \theta$ and $g_y = g \cos \theta$, respectively. Therefore, the tilt angle is $\theta = \tan^{-1}(g_x/g_y)$.

Note that the detection accuracy of the sensor 160 may be improved by providing a plurality of sensors in the imaging apparatus, and taking the average of values obtained from these sensors, for example.

The sensor 160 may output a difference between a value and a reference value instead of outputting the tilt angle, or output a difference between the value and a value that is immediately previously obtained.

In the above, an example is given of the case where the tilt angle when the image is captured is detected by detecting a weight using the acceleration sensor. However, the sensor 160 may detect, with use of the angular velocity sensor, an angular velocity at which the sensor 160 rotates, and calculates the tilt angle by temporally integrating angular velocities.

Also, even when the image processing unit 100 which is an example of the present invention is not included in the wearable terminal, the tilt angle detected by the sensor 160 when the image is captured may be stored in a memory, and the tilt angle may be read afterwards and used for the image correction.

(Image Correction Unit 150)

The image correction unit 150 corrects the captured image by rotating the captured image in accordance with a tilt angle estimated by the tilt estimation unit 140 or a tilt angle detected by the sensor 160. When the tilt estimation unit 140 estimates the tilt angle, the image correction unit 150 corrects the captured image with use of the estimated tilt angle. However, when the captured image does not include therein information sufficient enough for the tilt estimation unit 140 to estimate the tilt angle of the captured image, the image correction unit 150 corrects the captured image with use of the tilt angle detected by the sensor 160. The image correction unit 150 corrects the captured image by rotating, in the reverse direction, the captured image by an amount corresponding to an angle that is equal to the tilt angle of the captured image estimated or detected, as shown in FIGS. 2A, 2B and 2C.

Figure 19:
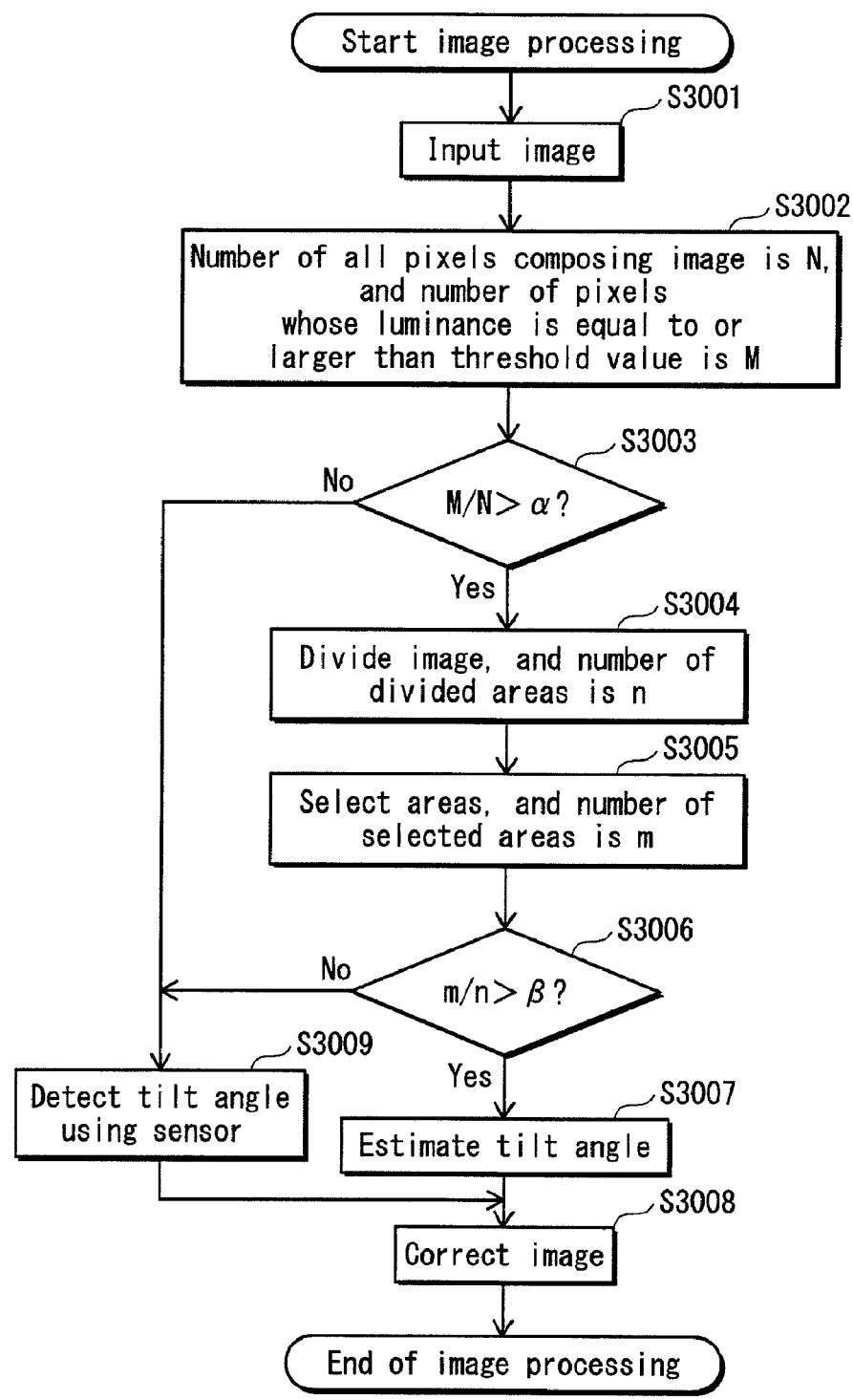
FIG. 19 is a flowchart showing an operation of the image processing device which is the example of the present invention.

FIG. 19 is a flowchart showing the operation of the image processing device 100 which is the example of the present invention.

The image processing unit 100 reads the captured image in the image input unit 110 at first (Step S3001), and then performs initialization such that: the number of all pixels that compose the input image is N; and the number of pixels whose luminance is equal to or larger than the threshold value is M.

When a ratio M/N is not larger than a threshold value a (Step S3003: N), the image processing unit 100 proceeds to Step S3009. When the ratio M/N is larger than the threshold value a (Step S3003: Y), the image processing unit 100 proceeds to Step S3004, and divides the captured image in the image division unit 120 (Step S3004). Hereinafter, n is defined as the number into which the captured image is divided. Next, the area selection unit 130 selects areas in which most of line segments are oriented in the same direction based on the directional characteristics of the textures included in the area determined by the direction judgment unit 125 (Step S3005). Hereinafter, m is defined as the number of selected areas.

When the ratio m/n is not larger than a threshold value β (Step S3006: N), the image processing unit 100 proceeds to Step S3009. When the ratio m/n is larger than a threshold value β (Step S3006: Y), the image processing unit 100 proceeds to Step S3007, and causes the tilt estimation unit 140 to estimate the tilt angle of the captured image (Step S3007).

The image correction unit 150 corrects the captured image by rotating the captured image by an amount corresponding to the tilt angle estimated by the tilt estimation unit 140 (Step S3008). However, when it is judged that it is not appropriate to estimate the tilt angle based on the image in Steps S3003 or S3006, the image correction unit 150 causes the sensor to detect the tilt angle (Step S3009), and corrects the captured image with use of the tilt angle.

This concludes the operation of the image processing unit 100 which is the example of the present invention.

Note that since the sensor 160 is not requisite, no processing may be performed on the captured image having insufficient information to estimate the tilt angle if the imaging apparatus does not include the sensor 160. In such a way, it is possible to prevent the image correction unit 150 from correcting the captured image based on the tilt angle incorrectly estimated, and therefore deterioration in the captured image may be prevented.

Also, even if the imaging apparatus includes a sensor 160, the estimation of the tilt angle using the sensor 160 does not have to be performed, and no processing may be performed on the captured image having insufficient information to estimate the tilt angle if it is difficult to estimate the tilt angle by the sensor 160. Here, an example of cases where it is difficult to estimate the tilt angle by the sensor 160 is a case where an amount of variation in values output by the sensor 160 in a predetermined time period is equal to or larger than a predetermined threshold value. In such a way, it is possible to prevent the image correction unit 150 from correcting the captured image based on the tilt angle incorrectly estimated, and therefore deterioration in the captured image can be prevented.

Alternately, if it is known that images are serially captured as with the wearable terminal, the tilt estimation unit 140 may estimate, from the estimated tilt angle of the image captured in the past, the tilt angle of the captured image having insufficient information to estimate the tilt angle by the tilt estimation unit 140. That is, histories of some of the recently estimated tilt angles of images may be kept, and changes in these tilt angles may be extrapolated, and thus the tilt estimation unit 140 may estimate the tilt angle of the captured image. Also, a tilt angle of the captured image that immediately precedes the tilt angle of the captured image having insufficient information to estimate the tilt angle by the tilt estimation unit 140 may be stored, and such a tilt angle of the captured image may be determined as the tilt angle of the immediately preceding captured image. This is processing based on the assumption that tilt angles of the captured images that have been captured serially change serially if the shaking of the imaging apparatus is small.

INDUSTRIAL APPLICABILITY

It is possible to correct the tilt of the captured image, and record and display the captured image oriented in the right direction by incorporating the image processing device which is the example of the present invention into a wearable terminal or the like. Since the image processing device selects, from among areas composing the captured image, one or more areas that are suitable for estimating a tilt angle, and estimates the tilt angle based on these areas, it is highly likely to estimate the right tilt angle even if the image is not captured in an upright state.

The invention claimed is:

1. An image processing device for correcting a captured image composed of a plurality of pixel blocks, each pixel block of the plurality of pixel blocks being composed of a predetermined number of horizontal and vertical pixels, the captured image being corrected using luminances each relating to a corresponding one pixel of the horizontal and vertical pixels, the image processing device comprising:

a judgment unit operable to, for each pixel block of the plurality of pixel blocks, (i) perform a calculation by substituting pairs of values in an equation for obtaining a directional distribution, each of the pairs of values being composed of a value indicating a position of each of pixels that compose the pixel block, and a value indicating one of the luminances that is associated with the indicated position, and (ii) judge whether or not the pixel block is suitable for estimating a tilt angle of a part of the captured image that corresponds to the pixel block, based on the obtained directional distribution, the directional distribution showing a distribution of directions each characterized by a part or all of an edge of an object included in the part of the captured image, the part or all of the edge corresponding to linearly-arranged two or more of the pixels;
a selection unit operable to select one or more pixel blocks of the plurality of pixel blocks that have been judged affirmatively; and
a correction unit operable to obtain a tilt angle of the captured image with respect to a reference axis using one or more of the directional distributions obtained for the selected one or more pixel blocks of the plurality of pixel blocks, and to perform the correction based on the obtained tilt angle of the captured image.

2. The image processing device of claim 1, wherein the judgment unit performs, for each pixel block of the plurality of pixel blocks, the calculation and the judgment.

3. The image processing device of claim 1,
wherein the directional distributions are directional distributions of luminance gradients,
wherein, when each of the luminance gradients is expressed as θ, and a luminance of each of pixels that corresponds to any position P(x, y) in a part of the captured image that corresponds to each pixel block of the plurality of pixel blocks is expressed as I(P), θ is expressed as follows:

$$\theta = \tan^{-1}(\Delta y/\Delta x),$$

where $\Delta x = \partial I(P)/\partial x$, and $\Delta y = \partial I(P)/\partial y$, $\Delta x$ being a luminance change in an x direction at the position P(x, y), and $\Delta y$ being a luminance change in a y direction at the position P(x, y), and
wherein each of the directional distributions of the luminance gradients is expressed as P(θ), P(θ) being a function of the luminance gradients of the pixels that compose each pixel block of the plurality of pixel blocks, and being a value obtained by accumulating a number of pixels whose luminance gradients are in a range of θ+Δθ and θ−Δθ.

4. The image processing device of claim 3,
wherein, before calculating each of the luminance gradients, the judgment unit performs filter processing of adding up values obtained by weighting peripheral pixels that surround a corresponding one pixel of the plurality of pixels,
wherein, when elements of a coefficient matrix used for the weighting are aij, the luminance change Δx at a position shown by indexes (n, m) is expressed as follows:

$$\Delta x(n, m) = \sum_{i=1}^{2k-1}\sum_{j=1}^{2k-1} a_{ij} I(n-k+i, m-k+j), \quad \text{[equation 1]}$$

and
wherein, when elements of a coefficient matrix used for the weighting are bij, the luminance change Δy at a position shown by indexes (n, m) is expressed as follows:

$$\Delta y(n, m) = \sum_{i=1}^{2k-1}\sum_{j=1}^{2k-1} b_{ij} I(n-k+i, m-k+j). \quad \text{[equation 2]}$$

5. The image processing device of claim 4, wherein a variance of each of the directional distributions of the luminance gradients that has been obtained for a corresponding one pixel block of the one or more pixel blocks of the plurality of pixel blocks that have been judged affirmatively is smaller than a predetermined value.

6. The image processing device of claim 4, wherein, in each pixel block of the one or more pixel blocks of the plurality of pixel blocks that have been judged affirmatively, a ratio of a number of pixels whose luminance gradients fall in a predetermined angular range to a number of all pixels is larger than a predetermined value, the predetermined angular range being centered on a mode of the luminance gradients of all the pixels.

7. The image processing device of claim 6,
wherein the image processing device continuously detects tilt angles of a plurality of captured images, and
wherein the predetermined angular range is determined based on tilt angles of one or more of the captured images that have been previously obtained by the correction unit.

8. The image processing device of claim 6,
wherein the image processing device continuously detects tilt angles of a plurality of captured images, and
wherein the predetermined angular range is determined based on a tilt angle of one of the captured images that has been immediately previously obtained by the correction unit.

9. The image processing device of claim 1,
wherein the directional distributions are directional distributions of intensities of luminance spectrums,
wherein each of the luminance spectrums is obtained by performing a two-dimensional discrete Fourier transform on a luminance I(x, y) of a part of the captured image that corresponds to each pixel block of the plurality of pixel blocks, the luminance I(x, y) being expressed as a discrete function that takes a certain value I at discrete two-dimensional coordinates (x, y),
wherein a luminance spectrum FI(u, v) transformed from the luminance I(x, y) of the captured image is expressed as follows:

$$FI(u, v) = \frac{1}{WH}\sum_{n=0}^{W-1}\sum_{m=0}^{H-1} I(n, m) e^{-\frac{i2\pi nu}{W}} e^{-\frac{i2\pi mv}{H}} \quad \text{[equation 3]}$$

where a predetermined number of horizontal pixels is expressed as W, and a predetermined number of vertical pixels is expressed as H, and
wherein, when the luminance spectrum FI(u, v) is expressed as polar coordinates (r, θ), the directional distributions of the intensities of the luminance spectrums expressed as P(θ) are each a square sum of the luminance spectrums FI(r, θ) along a line extending in a radial direction as follows:

$$P(\theta) = \sum_r |FI(r, \theta)|^2. \quad \text{[equation 4]}$$

10. The image processing device of claim 9, wherein a variance of each of the directional distributions of the intensities of the luminance spectrums that has been obtained for a corresponding one pixel block of the one or more pixel blocks of the plurality of pixel blocks that have been judged affirmatively is smaller than a predetermined value.

11. The image processing device of claim 1,
wherein the judgment unit obtains a directional distribution of luminance gradients using the selected one or more pixel blocks of the plurality of pixel blocks, and
wherein the correction unit obtains a tilt angle of the captured image based on a mode of the directional distribution of the luminance gradients.

12. The image processing device of claim 1, wherein the correction unit detects one or more line segments included in each pixel block of the selected one or more pixel blocks of the plurality of pixel blocks, and obtains the tilt angle of the captured image based on tilt angles of the detected line segments.

13. The image processing device of claim 12,
wherein the correction unit detects line segments included in all pixel blocks of the selected one or more pixel blocks of the plurality of pixel blocks, and
wherein the tilt angle of the captured image is a mode of tilt angles of the detected line segments.

14. The image processing device of claim 12,
wherein the correction unit detects line segments included in each pixel block of the selected one or more pixel blocks of the plurality of pixel blocks,
wherein a tilt angle of a part of the captured image that corresponds to each pixel block of the selected one or more pixel blocks of the plurality of pixel blocks is a mode of tilt angles of the detected line segments included in a corresponding one pixel block of the plurality of pixel blocks, and
wherein the tilt angle of the captured image is a mode of the tilt angles of parts of the captured image that correspond to a respective selected one or more pixel blocks of the plurality of pixel blocks.

15. The image processing device of claim 14, wherein, when a plurality of modes of the tilt angles of the parts of the captured image that correspond to the respective selected one or more pixel blocks of the plurality of pixel blocks exist, one of the modes that is preferentially adopted as the tilt angle of the captured image has longest line segments that tilt at a tilt angle of one of the parts of the captured image that corresponds to one pixel block of the selected one or more pixel blocks of the plurality of pixel blocks.

16. The image processing device of claim 14,
wherein the image processing device continuously corrects tilts of a plurality of captured images, and
wherein, when a plurality of modes of the tilt angles of the parts of the captured image that correspond to the respective selected one or more pixel blocks of the plurality of pixel blocks exist, one of the modes that is preferentially adopted as a tilt angle of each of the captured images is closest to a tilt angle estimated based on tilt angles of one or more of the captured images that have been previously obtained by the correction unit.

17. The image processing device of claim 14,
wherein the image processing device continuously corrects tilts of a plurality of captured images, and
wherein, when a plurality of modes of the tilt angles of the parts of the captured image that correspond to the respective selected one or more pixel blocks of the plurality of pixel blocks exist, one of the modes that is preferentially adopted as the tilt angle of the captured image is closest to a tilt angle estimated based on a tilt angle of one of the captured images that has been immediately previously obtained by the correction unit.

18. The image processing device of claim 12, wherein the selection unit excludes, from selection targets, one or more pixel blocks, of the plurality of pixel blocks, in each of which a ratio of a number of pixels whose luminance change is larger than a predetermined luminance change to a number of all pixels is larger than a predetermined threshold value.

19. The image processing device of claim 18,
wherein the image processing device continuously corrects tilts of a plurality of captured images, and
wherein, when a ratio of a number of selected one or more pixel blocks of the plurality of pixel blocks to a number of all pixel blocks of the plurality of pixel blocks that compose each of the captured image is smaller than a predetermined threshold value, the correction unit estimates a tilt angle of each of the captured images based on tilt angles of one or more of the captured images that have been previously obtained.

20. The image processing device of claim 18,
wherein the image processing device continuously corrects tilts of a plurality of captured images, and
wherein, when a ratio of a number of selected one or more pixel blocks of the plurality of pixel blocks to a number of all pixel blocks of the plurality of pixel blocks that compose each of the captured image is smaller than a predetermined threshold value, the correction unit estimates a tilt angle of each of the captured images based on a tilt angle of one of the captured images that has been immediately previously obtained.

21. The image processing device of claim 18, being included in an imaging apparatus including a sensor that detects a tilt angle with respect to a horizontal plane at a time of capturing an image,
wherein, when a ratio of a number of selected one or more pixel blocks of the plurality of pixel blocks to a number of all the pixel blocks of the plurality of pixel blocks that compose the captured image is smaller than a predetermined threshold value, the correction unit corrects the captured image using the tilt angle outputted by the sensor if a total change amount that tilt angles outputted by the sensor in a predetermined time period change is equal to or less than a predetermined threshold value.

22. The image processing device of claim 18, wherein, when a ratio of a number of the selected one or more pixel blocks of the plurality of pixel blocks to a number of all pixel blocks of the plurality of pixel blocks that compose the captured image is smaller than a predetermined threshold value, the correction unit does not perform the correction.

23. The image processing device of claim 18,
wherein the image processing device continuously corrects tilts of a plurality of captured images, and
wherein, when a ratio of a number of pixels whose luminances are each smaller than a predetermined threshold value to a number of all pixels composing each of the captured images is larger than a predetermined value, the correction unit estimates a tilt angle of each of the captured images based on tilt angles of one or more of the captured images that have been previously obtained.

24. The image processing device of claim 18,
wherein the image processing device continuously corrects tilts of a plurality of captured images, and
wherein, when a ratio of a number of pixels whose luminances are each smaller than a predetermined value to a number of all pixels composing each of the captured images is larger than a predetermined threshold value, the correction unit estimates a tilt angle of each of the captured images based on a tilt angle of one of the captured images that has been immediately previously obtained.

25. The image processing device of claim 18, being included in an imaging device including a sensor that detects a tilt angle with respect to a horizontal plane at a time of capturing an image,
   wherein, when a ratio of a number of pixels whose luminances are each smaller than a predetermined value to a number of all pixels composing each of the captured images is larger than a predetermined threshold value, the correction unit corrects the captured image using the tilt angle outputted by the sensor if a total change amount that tilt angles outputted by the sensor in a predetermined time period change is equal to or less than a predetermined threshold value.

26. The image processing device of claim 18, wherein, when a ratio of a number of pixels whose luminances are each smaller than a predetermined value to a number of all pixels composing the captured images is larger than a predetermined threshold value, the correction unit does not perform the correction.

27. The image processing device of claim 21, wherein the sensor is an acceleration sensor.

28. The image processing device of claim 21, wherein the sensor is an angular velocity sensor.

29. The image processing device of claim 21, wherein: if a total change amount that tilt angles outputted by the sensor in a predetermined time period change is equal to or larger than a predetermined threshold value, then the correction unit does not perform the correction.

30. An image processing method for correcting a captured image composed of a plurality of pixel blocks, each pixel block of the plurality of pixel blocks being composed of a predetermined number of horizontal and vertical pixels, the captured image being corrected using luminances each relating to a corresponding one pixel of the horizontal and vertical pixels, the image processing method comprising:
   a judgment step of, for each pixel block of the plurality of pixel blocks, (i) performing calculation by substituting pairs of values in an equation for obtaining a directional distribution, each of the pairs of values being composed of a value indicating a position of each of pixels that compose the pixel block, and a value indicating one of the luminances that is associated with the indicated position, and (ii) judging whether or not the pixel block is suitable for estimating a tilt angle of a part of the captured image that corresponds to the pixel block, based on the obtained directional distribution, the directional distribution showing a distribution of directions each characterized by a part or all of an edge of an object included in the part of the captured image, the part or all of the edge corresponding to linearly-arranged two or more of the pixels;
   a selection step of selecting one or more pixel blocks of the plurality of pixel blocks that have been judged affirmatively; and
   a correction step of obtaining a tilt angle of the captured image with respect to a reference axis using one or more of the directional distributions obtained for the selected one or more pixel blocks of the plurality of pixel blocks, and performing the correction based on the obtained tilt angle of the captured image.

31. The image processing method of claim 30, wherein the judgment step performs, for each pixel block of the plurality of pixel blocks, the calculation and the judgment.

32. A non-transitory computer-readable recording medium having an image processing program recorded thereon, the image processing program causing a computer to execute image processing that corrects a captured image composed of a plurality of pixel blocks, each pixel block of the plurality of pixel blocks being composed of a predetermined number of horizontal and vertical pixels, the captured image being corrected using luminances each relating to a corresponding one pixel of the horizontal and vertical pixels, the image processing program causing the computer to execute a method comprising:
   a judgment step of, for each pixel block of the plurality of pixel blocks, (i) performing calculation by substituting pairs of values in an equation for obtaining a directional distribution, each of the pairs of values being composed of a value indicating a position of each of pixels that compose the pixel block, and a value indicating one of the luminances that is associated with the indicated position, and (ii) judging whether or not the pixel block is suitable for estimating a tilt angle of a part of the captured image that corresponds to the pixel block, based on the obtained directional distribution, the directional distribution showing a distribution of directions each characterized by a part or all of an edge of an object included in the part of the captured image, the part or all of the edge corresponding to linearly-arranged two or more of the pixels;
   a selection step of selecting one or more pixel blocks of the plurality of pixel blocks that have been judged affirmatively; and
   a correction step of obtaining a tilt angle of the captured image with respect to a reference axis using one or more of the directional distributions obtained for the selected one or more pixel blocks of the plurality of pixel blocks, and performing the correction based on the obtained tilt angle of the captured image.

33. The non-transitory computer-readable recording medium of claim 32, wherein the judgment step performs, for each pixel block of the plurality of pixel blocks, the calculation and the judgment.

34. An image processor for correcting a captured image composed of a plurality of pixel blocks, each pixel block of the plurality of pixel blocks being composed of a predetermined number of horizontal and vertical pixels, the captured image being corrected using luminances each relating to a corresponding pixel of the horizontal and vertical pixels, the image processor comprising:
   a judgment unit operable to, for each pixel block of the plurality of pixel blocks, (i) perform a calculation by substituting pairs of values in an equation for obtaining a directional distribution, each of the pairs of values being composed of a value indicating a position of each of pixels that compose the pixel block, and a value indicating one of the luminances that is associated with the indicated position, and (ii) judge whether or not the pixel block is suitable for estimating a tilt angle of a part of the captured image that corresponds to the pixel block, based on the obtained directional distribution, the directional distribution showing a distribution of directions each characterized by a part or all of an edge of an object included in the part of the captured image, the part or all of the edge corresponding to linearly-arranged two or more of the pixels;
   a selection unit operable to select one or more pixel blocks of the plurality of pixel blocks that have been judged affirmatively; and
   a correction unit operable to obtain a tilt angle of the captured image with respect to a reference axis using one or more of the directional distributions obtained for the selected one or more pixel blocks of the plurality of pixel blocks, and to perform the correction based on the obtained tilt angle of the captured image.

35. The image processor of claim 34, wherein the judgment unit performs, for each pixel block of the plurality of pixel blocks, the calculation and the judgment.

36. The image processing device of claim 25, wherein the sensor is an acceleration sensor.

37. The image processing device of claim 25, wherein the sensor is an angular velocity sensor.

38. The image processing device of claim 25, wherein, if a total change amount that tilt angles outputted by the sensor in a predetermined time period change is equal to or larger than a predetermined threshold value, then the correction unit does not perform the correction.

* * * * *